United States Patent
Chaudhry et al.

(10) Patent No.: US 12,554,723 B1
(45) Date of Patent: Feb. 17, 2026

(54) PLATFORM FOR AGENTIC AI CREATION, CONTEXTUALIZED ENTERPRISE DATA INTERACTION, AND ENTERPRISE MEMORY

(71) Applicant: IP Holdings 2017 LLC, New York, NY (US)

(72) Inventors: Muhammad Saljook Asghar Chaudhry, Woodbridge, VA (US); Fabio Luzzi, Brooklyn, NY (US); Xinquan Ye, Hoboken, NJ (US)

(73) Assignee: IP HOLDINGS 2017 LLC, New York, NY (US)

( * ) Notice: Subject to any disclaimer, the term of this patent is extended or adjusted under 35 U.S.C. 154(b) by 0 days.

(21) Appl. No.: 19/253,777

(22) Filed: Jun. 28, 2025

(51) Int. Cl.
  *G06F 16/20* (2019.01)
  *G06F 16/2455* (2019.01)

(52) U.S. Cl.
  CPC .............. *G06F 16/24564* (2019.01)

(58) Field of Classification Search
  None
  See application file for complete search history.

(56) References Cited

U.S. PATENT DOCUMENTS

| | | | |
|---|---|---|---|
| 7,257,581 B1 | 8/2007 | Steele et al. | |
| 7,644,065 B2 * | 1/2010 | Wu | G06F 16/951 707/999.003 |
| 8,135,747 B2 | 3/2012 | Anzalone et al. | |
| 8,887,197 B2 | 11/2014 | Fengg et al. | |
| 9,201,981 B2 | 12/2015 | Anzalone et al. | |
| 10,467,636 B2 | 11/2019 | Gopal et al. | |
| 10,580,022 B2 | 3/2020 | L'huillier et al. | |
| 10,866,584 B2 | 12/2020 | Cella et al. | |
| 11,004,096 B2 | 5/2021 | Thomas et al. | |
| 11,048,725 B2 | 6/2021 | Schukovets | |
| 11,210,271 B1 | 12/2021 | Vishnoi | |
| 11,354,747 B2 | 6/2022 | Magdelinic | |
| 11,366,455 B2 | 6/2022 | Cella et al. | |
| 11,551,300 B2 | 1/2023 | Koziol et al. | |
| 12,321,725 B1 * | 6/2025 | Wilson | G06F 8/36 |
| 12,332,841 B1 * | 6/2025 | Hoagland | G06F 16/16 |

(Continued)

FOREIGN PATENT DOCUMENTS

| | | |
|---|---|---|
| CN | 116663664 A | 8/2023 |
| CN | 117492743 A | 2/2024 |

(Continued)

*Primary Examiner* — Jau Shya Meng
(74) *Attorney, Agent, or Firm* — BRYAN CAVE LEIGHTON PAISNER LLP

(57) ABSTRACT

A computer-implemented method that includes receiving, via an artificial intelligence (AI) agent, a user prompt from a user. The method also can include translating, via the AI agent, the user prompt to an LLM prompt using a business function semantic layer to interpret business function-specific language in the user prompt. The method additionally can include obtaining a data query generated by an LLM based on the LLM prompt. The method further can include executing the data query on an enterprise data system to obtain datasets responsive to the data query. The method additionally can include generating a response to the user prompt using a qualitative analysis of the datasets. The method further can include providing the response to the user. Other embodiments are described.

20 Claims, 10 Drawing Sheets

(56) References Cited

U.S. PATENT DOCUMENTS

| | | |
|---|---|---|
| 2007/0168947 A1 | 7/2007 | Halbedel et al. |
| 2008/0097740 A1 | 4/2008 | Beaton et al. |
| 2014/0032506 A1 | 1/2014 | Hoey |
| 2014/0279677 A1 | 9/2014 | Grosset et al. |
| 2014/0358845 A1 | 12/2014 | Mundlapundi et al. |
| 2015/0363711 A1 | 12/2015 | Raman |
| 2016/0283573 A1 | 9/2016 | Werner |
| 2018/0173750 A1 | 6/2018 | Dumant et al. |
| 2020/0067861 A1* | 2/2020 | Leddy ................ G06F 21/6245 |
| 2020/0117676 A1 | 4/2020 | Ben Moshe |
| 2021/0064953 A1 | 3/2021 | Exertier et al. |
| 2022/0036153 A1 | 2/2022 | O'Malia et al. |
| 2022/0036302 A1 | 2/2022 | Cella |
| 2022/0343432 A1 | 10/2022 | Magdelinic |
| 2022/0365945 A1 | 11/2022 | Yuan |
| 2023/0062655 A1 | 3/2023 | Wan |
| 2023/0306025 A1 | 9/2023 | Raghavan |
| 2023/0315402 A1 | 10/2023 | Cho et al. |
| 2024/0160611 A1 | 5/2024 | Shafiulla |
| 2024/0242154 A1* | 7/2024 | Jindal ................ G06Q 10/0637 |
| 2025/0029600 A1 | 1/2025 | Kim et al. |
| 2025/0078006 A1 | 3/2025 | Venugopalan |
| 2025/0103910 A1 | 3/2025 | Turley et al. |
| 2025/0103962 A1 | 3/2025 | Turley et al. |
| 2025/0165719 A1* | 5/2025 | Fukuyama .......... G06F 16/3329 |
| 2025/0181581 A1* | 6/2025 | Amour ................ G06F 16/2455 |
| 2025/0258760 A1* | 8/2025 | Holcomb ............ G06F 11/3684 |

FOREIGN PATENT DOCUMENTS

| | | |
|---|---|---|
| CN | 118467533 A | 8/2024 |
| CN | 118626073 A | 9/2024 |
| CN | 118862973 A | 10/2024 |
| CN | 119537959 A | 2/2025 |
| EP | 1830254 A2 | 9/2007 |
| EP | 4264533 A2 | 10/2023 |
| JP | 2002149946 A | 5/2002 |
| KR | 102192335 B1 | 12/2020 |
| KR | 102704008 B1 | 9/2024 |
| WO | 2022271141 A1 | 12/2022 |
| WO | 2023097026 A2 | 6/2023 |
| WO | 2025058830 A1 | 3/2025 |
| WO | 2025072369 A1 | 4/2025 |
| WO | 2025084458 A2 | 4/2025 |

\* cited by examiner

PLATFORM FOR AGENTIC AI CREATION, CONTEXTUALIZED ENTERPRISE DATA INTERACTION, AND ENTERPRISE MEMORY

TECHNICAL FIELD

This disclosure generally relates to a platform for agentic artificial intelligence (AI) creation, contextualized enterprise data interaction, and enterprise memory.

BACKGROUND

Enterprise organizations are increasingly seeking to leverage AI technologies to enhance productivity, decision-making, and automation across various business functions. The emergence of Large Language Models (LLMs) has transformed the interface between humans and digital systems. However, most enterprise-grade LLM implementations today are designed around centralized assistants, predominantly oriented toward single-user interactions, narrow data scopes, and limited governance frameworks. Existing solutions lack seamless integration with enterprise data systems, fail to provide adequate controls for user access and knowledge retrieval at granular levels, and struggle to provide flexibility, scalability, and integration capabilities for effective AI deployment across an organization. Additionally, many current implementations do not effectively capture and utilize the collective intelligence generated through AI interactions across the organization, limiting the long-term value and evolution of these systems.

BRIEF DESCRIPTION OF THE DRAWINGS

To facilitate further description of the embodiments, the following drawings are provided in which.

Figure 1:
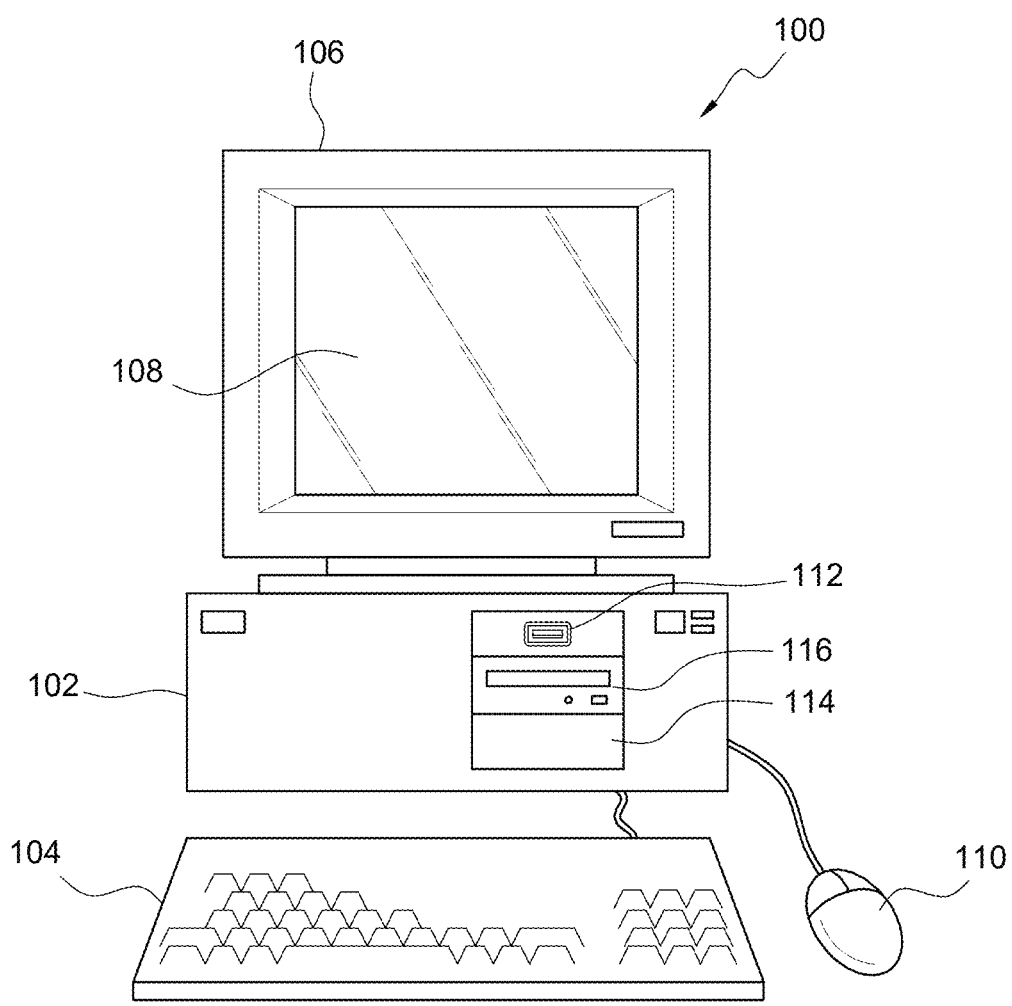
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time"

can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately 0.1 second, 0.5 second, one second, two seconds, five seconds, or ten seconds, for example.

DESCRIPTION OF EXAMPLES OF EMBODIMENTS

Various embodiments include a computer-implemented method includes receiving, via an artificial intelligence (AI) agent, a user prompt from a user. The method also can include translating, via the AI agent, the user prompt to an LLM prompt using a business function semantic layer to interpret business function-specific language in the user prompt. The method additionally can include obtaining a data query generated by an LLM based on the LLM prompt. The method further can include executing the data query on an enterprise data system to obtain datasets responsive to the data query. The method additionally can include generating a response to the user prompt using a qualitative analysis of the datasets. The method further can include providing the response to the user.

A number of embodiments include a system including one or more processors and one or more non-transitory computer-readable media storing computing instructions that, when executed on the one or more processors, cause the one or more processors to perform various operations. The operations can include receiving, via an artificial intelligence (AI) agent, a user prompt from a user. The operations also can include translating, via the AI agent, the user prompt to an LLM prompt using a business function semantic layer to interpret business function-specific language in the user prompt. The operations additionally can include obtaining a data query generated by an LLM based on the LLM prompt. The operations further can include executing the data query on an enterprise data system to obtain datasets responsive to the data query. The operations additionally can include generating a response to the user prompt using a qualitative analysis of the datasets. The operations further can include providing the response to the user.

Some embodiments include one or more non-transitory computer-readable media storing computing instructions that, when executed on one or more processors, cause the one or more processors to perform various operations. The operations receiving, via an artificial intelligence (AI) agent, a user prompt from a user. The operations also can include translating, via the AI agent, the user prompt to an LLM prompt using a business function semantic layer to interpret business function-specific language in the user prompt. The operations additionally can include obtaining a data query generated by an LLM based on the LLM prompt. The operations further can include executing the data query on an enterprise data system to obtain datasets responsive to the data query. The operations additionally can include generating a response to the user prompt using a qualitative analysis of the datasets. The operations further can include providing the response to the user.

Figure 2:
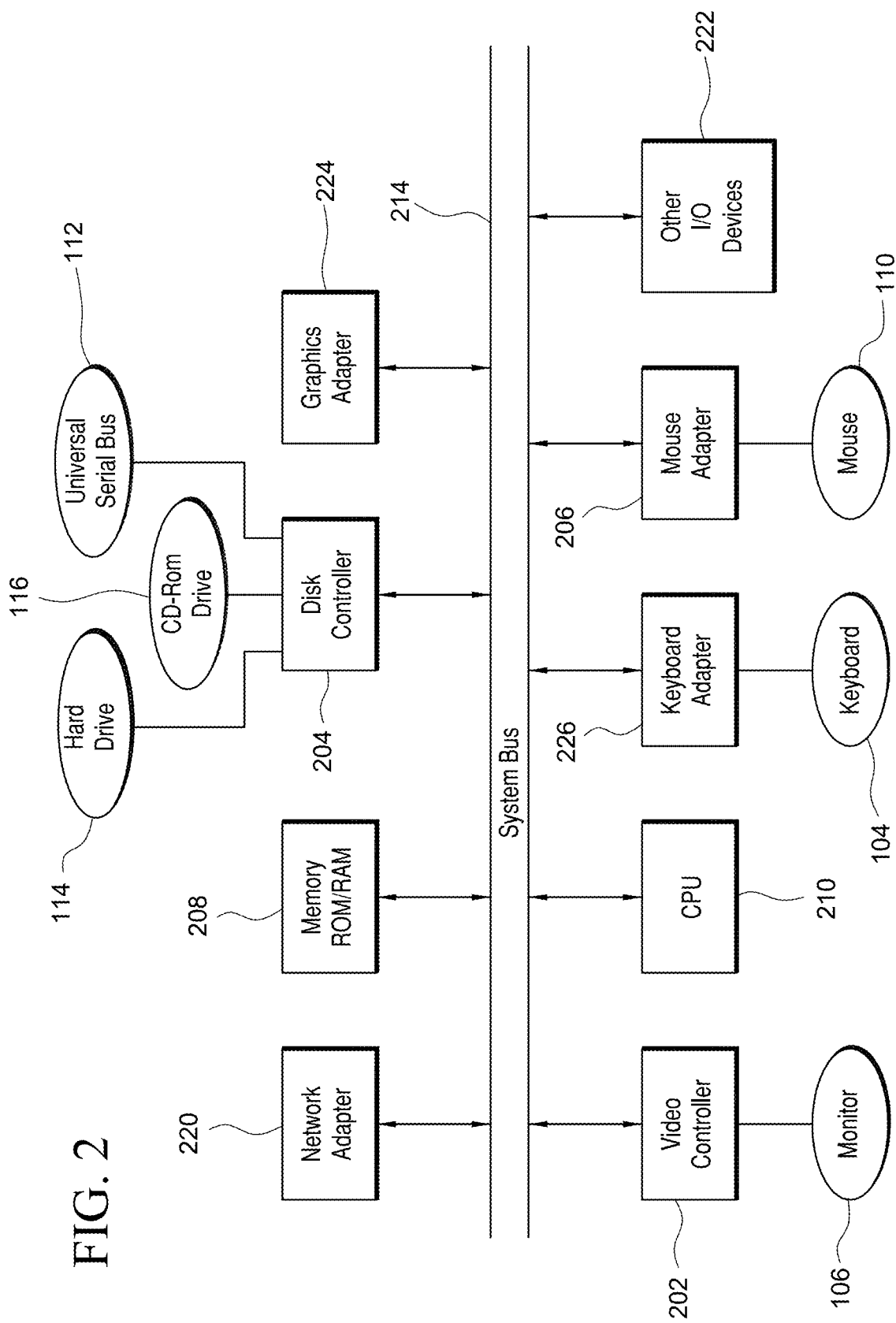
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random-access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or DVD, Blu-Ray, or other suitable media, such as media configured to be used in DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can include one or more of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the WebOS operating system by LG Electronics of Seoul, South Korea, (iii) the Android™ operating system developed by Google, of Mountain View, California, United States of America, or (iv) the Windows Mobile™ operating system by Microsoft Corp. of Redmond, Washington, United States of America.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a DVD in DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general-purpose computer to a special purpose computer. For purposes of illustration, programs and other executable program components are shown herein as discrete systems, although it is understood that such programs and components may reside at various times in different storage components of computer system 100 and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
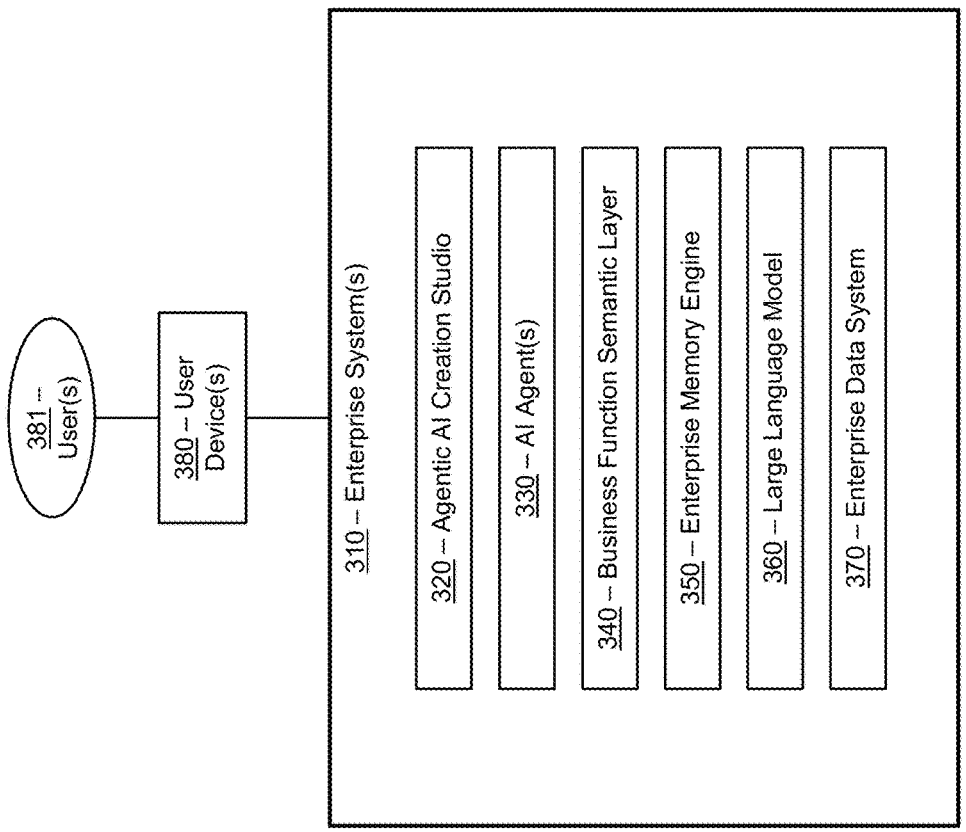
FIG. 3 illustrates a block diagram of a system that can be utilized for agentic AI creation, contextualized enterprise data interaction, and enterprise AI memory storage, in accordance with an embodiment.

Turning ahead in the drawings, FIG. 3 illustrates a block diagram of a system 300 that can be utilized for agentic AI creation, contextualized enterprise data interaction, and enterprise AI memory storage, in accordance with an embodiment. System 300 is illustrative in nature, and embodiments of the system are not confined to the configurations presented herein. The system can be employed in a many different embodiments or examples not specifically depicted or described in this document. In some embodiments, particular elements, modules, or components of system 300 can execute various procedures, processes, and/or activities. In other embodiments, these procedures, processes, and/or activities can be carried out by other appropriate elements, modules, or components of system 300.

System 300 can include one or more enterprise systems (e.g., enterprise system 310) and one or more user devices (e.g., user device 380), which can be used by one or more users (e.g., user 381). Enterprise system 310 can be implemented using hardware and/or software, as detailed herein. In some embodiments, the hardware and/or software can be standard, while in other embodiments, the hardware and/or software can be tailored (e.g., optimized) for executing part or all of the functionalities of enterprise system 310 as described herein. Enterprise system 310 and user device 380 can each be a computer system, such as computer system 100 (FIG. 1), as described above, and can be a single computer, a single server, or a cluster or collection of computers or servers, or a cloud of computers or servers. In another embodiment, a single computer system can host enterprise system 310 and user device 380.

In some cases, user 381 can provide inputs or prompts through user device 380 to enterprise system 310 or components thereof. Enterprise system 310 can process these inputs using its various components to generate appropriate responses or actions, or to generate resources. The responses or actions can then be communicated back to user 381 through user device 380, or such resources can made available for use by user 381 through user device 380.

Enterprise systems 310 can include one or more components for AI application creation, management, and/or operation. Enterprise system 310 can enable creation and management of AI agents that can interact with users or automate workflows without human intervention. The components of enterprise system 310 can work together to process user inputs, generate responses, and manage enterprise data and knowledge.

In many embodiments, enterprise system 310 can include an agentic AI creation studio 320, one or more AI agents (e.g., AI agent 330), a business function semantic layer 340, an enterprise memory engine 350, one or more large language models (e.g., LLM 360), an enterprise data system 370, and/or other suitable systems. In many embodiments, agentic AI creation studio 320 can enables creation of AI agents (e.g., AI agent 330). In some cases, the agentic AI creation studio 320 can provide full source code to allow for further customization of AI agents (e.g., 330). Agentic AI creation studio 320 can include governance and access features to limit access to information to those with permissions.

In many embodiments, AI agents (e.g., 330) can interact with users and perform various tasks. In some implementations, the AI agent 330 is a master AI agentic agent that controls additional AI agents. AI agent 330 can serve as an intelligent interface between users (e.g., 381) and other components or enterprise system 310, capable of interpreting requests, performing tasks, and generating responses. AI agent 330 can use one or more action groups to process user inputs and conduct data analysis, and/or can controlling additional AI agents in some implementations. AI agent 330 can interact with a LLM 360 to facilitate natural language understanding and generation, utilizing business function semantic layer 340 to interpret and produce domain-specific language. Additionally, AI agent 330 can access enterprise memory engine 350 to retrieve relevant past interactions and enterprise data system 370 to analyze both structured and unstructured data, enabling it to provide contextually appropriate and data-driven responses to user queries.

In many embodiments, business function semantic layer 340 is provided within the enterprise system 310 to supply domain-specific knowledge and terminology. Business function semantic layer 340 can be embedded and persistent in the AI agent 330. In some cases, business function semantic layer 340 can be built domain-agnostic to allow it to work with various different LLM, and in some cases, the LLM can be switched at runtime. Business function semantic layer 340 can work in conjunction with the LLM 360 to interpret and generate domain-specific language, enhancing the ability of AI agent 330 to understand and respond to business-related queries. Business function semantic layer 340 can serve as a bridge between generic language understanding capabilities and specialized enterprise terminology, which can improve the accuracy and relevance of AI-generated responses. Business function semantic layer 340 be updatable, allowing the enterprise to refine and expand its domain-specific knowledge over time as the enterprise evolves.

In many embodiments, business function semantic layer 340 can be a detailed configuration file that interprets business taxonomy and enterprise-specific language. This configuration file can be fully customizable and/or can be refreshed, as needed, to adapt to changing business contexts or in case of file corruption.

At runtime of an AI agent (e.g., 330), AI agent can include custom code to pull business function semantic layer 340 and/or enterprise memory engine 350 when a question is asked by a user. This dynamic access approach can provide the most current and relevant information is utilized in processing user inquiries.

In some embodiments, when a user poses a question, the system can initiate a multi-step workflow. First, the query can be routed to the custom code, which can interpret the question by fusing insights from enterprise memory engine 350 with business function semantic layer 340. After interpretation, a LLM (e.g., 360) generates a data query, such as SQL (Standard Query Language) code. This data query can be used to query enterprise data system 370 and/or curated aspects thereof, which can contain attributes and data for the relevant business function. Upon receiving the quantitative data from the SQL query, the system synthesizes this information with the qualitative analysis capabilities of the LLM (e.g., 360). The result output to the user can be a curated response that represents a synthesis of both the quantitative and qualitative analyses. In some embodiments, the system also can incorporate a feedback mechanism, such as allowing users to "like" or "dislike" the response. This user feedback can be recorded and used to provide a weighted average of response data to enterprise memory engine 350, which can enable continuous improvement of the system's performance and accuracy over time. This workflow represents a significant technical improvement in enterprise AI systems, by combining real-time data access, sophisticated language processing, and/or user feedback to deliver highly relevant and accurate responses to business queries. The integration of quantitative data analysis with qualitative LLM capabilities can enable the system to provide comprehensive insights that go beyond simple data retrieval or natural language processing alone. Conventional LLMs are incapable of providing such quantitative analysis.

In many embodiments, enterprise memory engine 350 can store and manage AI interaction data. Enterprise memory engine 350 can include both short-term memory and long-term memory for how the AI agents (e.g., 330) are LLM is used. In some implementations, enterprise memory engine 350 can allow AI agent 330 to suggest pre-answered queries, which can improve response efficiency. Enterprise memory engine 350 can enhance the performance of agents over time by storing and analyzing past interactions. In some cases, data from enterprise memory engine 350 can be fed into training or fine-tuning cycles for AI agents (e.g., 300) or LLM 360. Enterprise memory engine 350 can work in conjunction with other components of enterprise system 310 to provide context and historical information for more accurate and personalized responses.

In many embodiments, enterprise memory engine 350 can serves as a enterprise's "long-term" governed and audited physical memory. Enterprise memory engine 350 can thus build a smart "community intelligence engine" through enterprise users' interactions with AI agents (e.g., 330). Enterprise memory engine 350 can grow and increase in relevance and power as the company's usage of AI agents (e.g., 330) increases. Enterprise memory engine 350 can maintain a record of all questions and responses, along with weighted average response times, in a transactional system. This approach can enable auditing and governance. The approach also can build a knowledge base for future queries.

When a user submits a query, the system can initiate a workflow, as described above. The query can be routed to the custom code that interprets the query by fusing insights from enterprise memory engine 350 and business function semantic layer 340. The information within enterprise memory engine 350 can grow organically over time with users using AI agents (e.g., 330). In some cases, minimal "seeding" can be performed to provide baseline company awareness. Following interpretation, LLM 360 can generates the data query (e.g., SQL code) to query enterprise data system 370. The system can provide enterprises with the flexibility to "completely" or "selectively" wipe (e.g., delete) parts of enterprise memory engine 350 through an interface, which can facilitate the ongoing accuracy of data analysis. In some embodiments, the activities within enterprise memory engine 350 can be subject to monitoring, auditing, and/or control through RBAC and/or Feature-Based Access Control (FBAC). This governance framework can allow enterprise memory engine 350 to be a secure and reliable resource for enterprise intelligence while maintaining compliance with data protection and privacy requirements. These techniques to enterprise memory and knowledge management represents a significant advancement in AI-driven business systems. By combining organic knowledge growth with governance and flexible management tools, the system can provide a powerful, adaptable, and secure platform for enterprise-wide intelligence and decision-making support.

In many embodiments, LLM 360 is incorporated within the enterprise system 310 for natural language processing and generation capabilities. In some embodiments, LLM 360 can be outside enterprise system 310, but access via enterprise system 310. LLM 360 can work in conjunction with business function semantic layer 340 to interpret and generate domain-specific language. In some implementations, LLMs (e.g., 360) can be interchangeable, allowing enterprise system 310 to utilize different LLMs as needed or as specified by agentic AI creation studio 320 and/or AI agent 330. LLM 360 can process user inputs, generate responses, and assist in various language-related tasks across enterprise system 310. In some cases, LLM 360 can be fine-tuned or customized using enterprise-specific data to enhance its performance in the particular business context. LLM 360 can enable AI agent 330 to engage in natural language interactions and perform complex language-based tasks.

In many embodiments, enterprise data system 370 can store and manage enterprise data used by the various components. In some embodiments, enterprise data system 370 can contain both structured and unstructured data that AI agent 330 can access and analyze. In some implementations, enterprise data system 370 can serve as a centralized repository for all enterprise-related information, enabling seamless data integration across different business functions. Enterprise data system 370 can work in conjunction with other components of enterprise system 310, such as business function semantic layer 340 and LLM 360, to provide relevant data for processing user requests and generating insights. In some cases, enterprise data system 370 can be updated in real-time, to enable AI agents (e.g., 330) to have access to the most current information. Enterprise data system 370 can be designed with appropriate security and governance measures to protect sensitive business data while allowing authorized AI agents to leverage it for various tasks. In some embodiments, enterprise data system 370 can be similar or identical to the centralized data system described in U.S. Pat. No. 12,298,950, issued May 13, 2025, titled "Centralized Data Platform for Disparate Applications," which is incorporated herein by reference in its entirety.

The components of enterprise system 310 can be interconnected to enable data flow and communication between agentic AI creation studio 320, AI agent 330, business function semantic layer 340, enterprise memory engine 350, LLM 360, and enterprise data system 370. This interconnected architecture allows for seamless creation, management, and operation of AI applications within the enterprise environment. These components of enterprise system 310 can each be a computer system, such as computer system 100 (FIG. 1), as described above, and can be a single computer, a single server, or a cluster or collection of computers or servers, or a cloud of computers or servers. In another embodiment, a single computer system can multiple components of enterprise system 310.

In various embodiments, enterprise system 310 can be on-premises ("on-prem"), in the cloud, hosted on SaaS (software as a service) systems, PaaS (platform as a service) systems, etc. For example, enterprise system 310 can use Amazon Web Services (AWS), Microsoft Azure, etc. In some embodiments, enterprise system 310 is not tied to a particular solution or vendor, but instead can be used on any suitable system and/or can be extendible, such as through horizontal scaling.

End user devices 380 can be computer systems, such as computer system 100 (FIG. 1), as described above. In some embodiments, end user devices 380 can be desktop computers, laptop computers, mobile devices, and/or other endpoint devices used by one or more users (e.g., users 381). A mobile device can refer to a portable electronic device with the capability to present audio and/or visual data (e.g., text, images, videos, music, etc.). For example, a mobile device can include at least one of a smartphone, a personal digital assistant, a handheld digital computer device (e.g., a tablet), a laptop computer device, a wearable user computer device, or another portable computer device with the capability to present audio and/or visual data. Thus, in many examples, a mobile device can include a volume and/or weight sufficiently small as to permit the device to be easily conveyable by hand.

Exemplary mobile devices can include (i) an iPhone®, iPad®, MacBook® or similar product by Apple Inc. of Cupertino, California, United States of America, and/or (ii) a Galaxy™ or similar product by the Samsung Group of Samsung Town, Seoul, South Korea. Further, in the same or different embodiments, a mobile device can include an electronic device configured to implement one or more of (i) the iOS® operating system by Apple Inc. of Cupertino, California, United States of America, or (ii) the Android™ operating system developed by the Open Handset Alliance.

In many embodiments, enterprise system 310 and/or the components thereof can each include one or more input devices (e.g., one or more keyboards, one or more pointing devices such as a computer mouse, one or more touchscreen displays, a microphone, etc.), and/or can comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to enterprise system 310 and/or the components thereof in a wired manner and/or a wireless manner, and the coupling can be direct and/or indirect, as well as locally and/or remotely.

In many embodiments, enterprise system 310 can include other components, such as various disparate application, such as applications of an enterprise. For example, application can include point-of-sale (POS) systems, web systems, digital e-commerce applications, and/or other suitable applications.

The components of enterprise system 310 can be implemented as modules of computing instructions (e.g., software modules) stored on non-transitory computer-readable media that operate on one or more processors. Alternatively, or in addition, the components of enterprise system 310 can be implemented in hardware. The components of enterprise system 310 described herein are merely exemplary, and other suitable arrangements of components within system 300 are contemplated.

In many embodiments, enterprise system 310 and/or various components thereof, such as enterprise data system 370, can include various datastores that store data. In some embodiments, one or more of such datastores can include a structured (e.g., indexed) collection of data and can be managed by any suitable database management systems configured to define, create, query, organize, update, and manage database(s). Exemplary database management systems can include MySQL Database, PostgreSQL Database, Microsoft SQL Server Database, Oracle Database, SAP Database, and IBM DB2 Database.

Meanwhile, communications within enterprise system 310 and/or with the datastores can be implemented using any suitable manner of wired and/or wireless communication. Accordingly, enterprise system 310 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless USB, Z-Wave, etc.; exemplary LAN and/or WAN protocol(s) can include Ethernet, WiFi, etc.; and exemplary wireless cellular network protocol(s) can include GSM, GPRS, CDMA, EV-DO, EDGE, UMTS, DECT, Digital AMPS, iDEN, HSPA+, LTE, WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

Many business enterprises (e.g., large organizations) are exploring AI assistants powered by LLMs to improve productivity and decision-making across the enterprise. Unlike consumer-facing chatbots, enterprise AI solutions, such as those provided by the techniques described herein, can be designed for internal use, can connect deeply with company data and workflows, and/or can meeting stringent security and governance requirements. For example, the techniques described herein can provide enterprise-grade AI capabilities via LLM platforms with cross-functional scalability, build-in governance and access control, business context and data integration, and/or process automation with security.

In providing cross-functional scalability, the techniques described herein can work across diverse business functions (e.g., marketing, supply chain, finance, HR, etc.) to break down data silos and provide value in each domain. In many embodiments, cross-functional scalability can allow AI agents (e.g., 330) to handle varied tasks, from generating marketing copy to analyzing financial reports, often within a single interface.

In providing built-in governance and access control, the techniques described herein can provide robust permission frameworks to control who can access what data and which AI features. The platform can integrate with enterprise identity systems (e.g., SSO (Single Sign-On)/Active Directory, etc.) to enforce user-to-data access rights, and support admin-level policies (e.g., down to specific knowledge bases or features) to prevent misuse. Audit logs and compliance settings can be used for tracking how AI agent 330 and/or LLM 360 is used.

In providing business context and data integration, the techniques described herein can enable LLM 360 to understand the organization's context by integrating with enterprise data system 370, warehouses, and knowledge bases. The techniques can draw on both structured data (e.g., databases, ERP (enterprise resource planning) data) and unstructured content (e.g., documents, emails, meeting minutes) to provide informed responses. These techniques can involve retrieval from knowledge stores or fine-tuning on proprietary data, so the answers provided by the AI agents (e.g., 330) are grounded in accurate, up-to-date business information.

In providing process automation with security, the techniques described herein can enable automating business processes. In many embodiments, the techniques can go beyond questions and answers, and not just suggest answers, but execute or coordinate multi-step workflows securely. These techniques can generate draft reports, update systems, or trigger approvals based on conversational commands. These techniques can provide that such actions respect security rules and data privacy, with robust safeguards to prevent unintended data exposure or unauthorized transactions.

In many embodiments, the techniques described herein can advantageously provide significant technical improvements over conventional LLMs. Conventional enterprise-grade LLM implementations are generally designed around centralized assistants, predominantly oriented toward single-user interactions, narrow data scopes, and limited governance frameworks. These conventional implementations are generally constrained in their inability to scale across diverse business functions, integrate securely with enterprise data systems, govern user access and knowledge retrieval at fine-grained levels, and evolve through shared enterprise memory. The techniques described herein can provide significant technical improvements by providing a unified, extensible platform that can allows end users to instantiate and evolve personalized AI agents (e.g., 330), teach LLMs (e.g., 360) domain-specific logic via a business semantic layer (e.g., 340), and/or orchestrate collective memory (e.g., enterprise memory engine 350) across interactions in a secure, enterprise-governed system. These techniques can provide an enterprise AI platform architecture that provides an orchestrated ecosystem that transforms static LLM assistants into intelligent, composable, and organizationally aware agents. The platform can integrate tightly with enterprise data (e.g., in enterprise data system 370), permissions, and workflows, be LLM-agnostic, and/or supporting plug-and-play extensibility.

In many embodiments, the techniques described herein can beneficially provide significant technical improvements by providing enterprise-grade capabilities, such as cross-functional scalability, build-in governance and access control, business context and data integration, and/or process automation with security. For cross-functional scalability, the platform can function across all or many core business domains, such as marketing, merchandising, supply chain, finance, HR, and IT, via natural language interfaces tailored to the logic, data structures, and terminologies of each function. These techniques can enable enterprise users to execute diverse tasks (e.g., generating marketing copy, analyzing sales trends, preparing financial commentary) within a single, integrated conversational experience. For build-in-governance and access control, the platform can integrate natively with enterprise identity providers (e.g. SSO, Active Directory) and can supports role-based access controls (RBAC), feature-level permissions (e.g., who can run analytics vs. access code-generation tools), knowledge-base-level permissions (e.g., private vs. departmental vs. public datasets), and/or full audit logging of prompts, outputs, and system actions, which can beneficially provide security, compliance, and/or traceability for user interactions. For business context and data integration, the platform can integrate with enterprise data systems (e.g., 370), including structured (e.g. ERP, CRM (customer relationship management), planning systems) and unstructured (e.g. document repositories, intranet, wikis, emails) data. In some cases, retrieval-augmented generation (RAG) can be used to ground responses in real-time, accurate information. Unlike general-purpose assistants, the platform can understand business logic, hierarchies, and context, which can beneficially make responses actionable and specific. For process automation and security, beyond answering questions, the platform can automate processes such as triggering workflows, updating databases, and/or initiating approvals. Each action can be permission-aware and operate within secure orchestration layers (e.g., role and/or function-based constraints, audit trails, and/or approvals), which can provide an intelligent work orchestrator, not merely a chatbot. These capabilities can provide enterprise-ready LLM deployment.

In many embodiments, the techniques described herein can provide unique architectural approaches that provide technical improvements to enable modern enterprises to scale intelligence and automation, such as an agentic AI creation studio (e.g., 320), a business function semantic layer (e.g., 340), and/or an enterprise memory engine (e.g., 350).

In many embodiments, the agentic AI studio (e.g., 320) can include a knowledge base marketplace and/or governance workflow. In some embodiments, the agentic AI studio (e.g., 320) can provide an interactive, studio-like environment that allows an authenticated enterprise user (e.g., based on permission) to create personalized AI agents (e.g., 330), such as agentic AI copilots. The AI agents (e.g., 330) created by agentic AI creation studio 320 can be pre-equipped with the enterprise-ready capabilities (e.g., governance, automation, access, integration), as described above, can be capable of being connected to either custom-built knowledge bases and/or a curated enterprise marketplace of reusable data sources, workflows, and/or instructions, and/or can be subject to approval workflows before being deployed or shared across business units.

Conventional enterprise tools allow admins or developers to define agents or flows, but do not enable self-service AI agent creation at the user level, under governance. The knowledge base marketplace in the techniques described herein introduces a new layer of AI reusability and standardization, as knowledge bases are not just static documents or datasets, but instead, they can be modular, auditable intelligence sources approved for enterprise LLM consumption. The governance framework around agent sharing, publishing, and lifecycle management can be similar to enterprise app stores, but can be specifically designed for AI agents (e.g., 330) operating within sensitive data ecosystems.

In an example of a practical application, a merchandiser can create a personalized AI agent (e.g., 330) that pulls sell-through, markdowns, and demand forecasts, connect this information to a departmental forecast model, and share this output with planners, after approval by a governance officer.

In various embodiments, the business function semantic layer (e.g., 340) can provide a configurable, domain-aware semantic layer. The business function semantic layer (e.g., 340) can function as a business ontology and abstraction engine, translating raw enterprise data from sources such as data lakes, warehouses, and APIs (application programming interfaces) into functionally relevant entities. This configuration enables a connected LLM (e.g., 360) to understand domain-specific metrics, calculations, hierarchies, and relationships of the business function in the enterprise. The business function semantic layer (e.g., 340) can allows LLMs (e.g., 360) to interpret abstract queries (e.g., "What's driving gross margin softness in Region A?") without involving retraining, and/or to navigate complex enterprise data structures, while maintaining governance protocols.

The business function semantic layer (e.g., 340) represents a technical improvement compared to conventional solutions. Most conventional LLMs rely on prompt-level context or Retrieval-Augmented Generation (RAG), but the business function semantic layer (e.g., 340) can provide embedded, persistent access to business semantics beyond vendor-specific ecosystems. Unlike existing semantic layers found in Business Intelligence (BI) tools, which are not optimized for LLM interaction, the business function semantic layer (e.g., 340) can be purpose-built for LLM interoperability. The business function semantic layer (e.g., 340) can abstract Key Performance Indicators (KPIs) and metadata into LLM-friendly representations, enabling LLM-agnostic domain intelligence. These techniques can allow enterprises to integrate various LLM models (e.g., GPT-4, Claude, Mistral, or proprietary models, etc.) and have the LLM operate with business fluency out of the box.

In an example of a practical application, when a user submits a query such as "How are we doing on full price sell-through versus last year?", the business function semantic layer (e.g., 340) can map this natural language input to relevant business concepts. This mapping process can involve correlating the query to specific data structures such as SKU hierarchy, discount flags, and comparable period logic. As a result, the LLM (e.g., 360) can be equipped with the context to formulate an accurate and business-relevant response (which can be written in business terms), which can advantageously enable effectively translating complex data relationships into actionable business insights.

In several embodiments, the enterprise memory engine (e.g., 350) can implement a short and long-term memory architecture. The enterprise memory engine (e.g., 350) can function as an enterprise-wide memory system, which can capture, abstract, and/or reuse organizational interactions with AI agents across multiple users and over extended periods. The enterprise memory engine (e.g., 350) can include a short-term memory component, a long-term memory component, and/or cross-user synthesis component. The short-term memory component can maintain session-aware context for ongoing conversations, including recent user queries, referenced files, and/or conversation goals. This short-term context can be referred to as the user's "Persona." The long-term memory component can store persistent logs and/or embeddings of user-agent interactions, which can be distilled into reusable organizational memory assets. These assets can include playbooks, business strategies, patterns, recommendations, historical decisions, and/or frequently requested data pulls. The cross-user synthesis component can enable the system to surface emerging patterns, such as identifying common questions from specific user groups (e.g., "top questions from sales leaders"), power suggestion engines (e.g., "others in your team asked . . ."), and/or dynamically enhance agent performance through enterprise-wide learnings.

The enterprise memory engine (e.g., 350) can provide a significant technical improvement in the field of enterprise AI. Although conventional platforms have implemented user-level memory, the enterprise memory engine (e.g., 350) can uniquely orchestrates memory at an enterprise-wide scale, spanning across users, AI agents (e.g., 330), and/or various business functions. This design can allow LLMs (e.g., 360) to learn and reason based on prior interactions, such as within a single conversation thread, across different departments and time periods, etc., while maintaining governance, searchability, and/or role-based access controls.

The enterprise memory engine (e.g., 350) can provide several practical applications, including the ability to suggest pre-answered queries, improve agent performance over time, and provide valuable input for training or fine-tuning cycles of in-house LLMs (e.g., 360). In an example of a practical application, a pricing analyst might not need to ask about elasticity models used in a previous quarter, but instead, the system can proactively recall relevant past conversations and offer a synthesized, explainable answer based on how the pricing team has previously interacted with the platform. This capability significantly enhances efficiency and knowledge sharing across the organization.

In various embodiments, the techniques described herein can integrates the agentic AI creation studio (e.g., 320), the business function semantic layer (e.g., 340), and the enterprise memory engine (e.g., 350) to create a modular, scalable, and intelligent system for enterprise-wide AI enablement. This integrated platform can provide several technical improvements to the field of enterprise AI. First, the system can democratize the creation and management of AI agents (e.g., 330), while maintaining strict enterprise governance, using integrates the agentic AI creation studio (e.g., 320). This approach can allow for widespread adoption and customization of AI agents across various business functions, within a controlled and secure environment. Second, the platform can teach any LLM (e.g., 360) enterprise-specific semantics and business reasoning through a pluggable abstraction layer (e.g., the business function semantic layer (e.g., 340)). This capability can enable the system to adapt to different LLMs (e.g., 360) while maintaining a consistent understanding of the organization's unique business context. Third, the system can construct a collective, evolving intelligence layer (e.g., enterprise memory engine (e.g., 350)) derived from user interactions. This intelligence can be codified into a secure and auditable memory fabric, which can allow for continuous improvement and knowledge sharing across the enterprise. The resulting platform can be designed to be LLM-agnostic, data-system agnostic, and functionally composable. This architecture can transform the traditional enterprise AI model from a centralized assistant into a decentralized, knowledge-aware, and automation-capable ecosystem of AI agents (e.g., 330). These AI agents (e.g., 330) can collaborate, learn, and operate securely at scale across the organization.

In various embodiments, these techniques represent a significant advancement over existing enterprise AI solutions that leverage LLMs for productivity, decision-making, and automation. While current offerings from major technology providers and emerging players typically provide capabilities such as integration with office productivity tools, natural language querying of enterprise data, role-based access controls, limited workflow automation, and domain-specific AI assistants, the techniques described herein can offer a unified architecture that combines foundational enterprise-grade LLM capabilities with novel architectural approaches. Existing solutions each have limitations in their approach. For example, some are restricted to specific ecosystems, lack user-level agent creation capabilities, or do not support long-term memory across users. Others may provide powerful models but lack native integration with enterprise data systems or collaborative memory features. Even the most advanced current offerings are often tied to specific platforms and do not support decentralized agent creation or knowledge base marketplaces with approval workflows.

In contrast, the platform described herein can provide a composable, multi-agent platform that enables self-service creation of AI agents (e.g., 330) through a governed agentic AI creation studio (e.g., 320); business reasoning capabilities for an LLM (e.g., or any LLM) via a business function semantic layer (e.g., 340), which can be domain-agnostic; and/or the capture and evolution of collective organizational intelligence through an enterprise memory engine (e.g., 350), which can include a short-term and long-term memory engine. This architecture represents a significant technical improvement beyond current solutions, transforming the enterprise LLM model from a centralized chatbot paradigm to a distributed, intelligent, and/or organizationally aware agent ecosystem. The system forms the foundation of a new enterprise AI operating system that is modular, governed, memory-aware, and/or capable of scaling intelligence across the entire organization, which can advantageously address limitations found in existing solutions, and can offer a more comprehensive and flexible approach to enterprise AI implementation.

In some embodiments, the platform can be provided as a modular platform, which can enable enterprises to rapidly deploy governed, domain-aware, and/or automation-capable AI agents without building from scratch. The platform can be provided on software as a service (SaaS)-based enterprise AI infrastructure, domain-specific agent libraries, semantic layer integrations, and/or enterprise memory systems.

Figure 4:
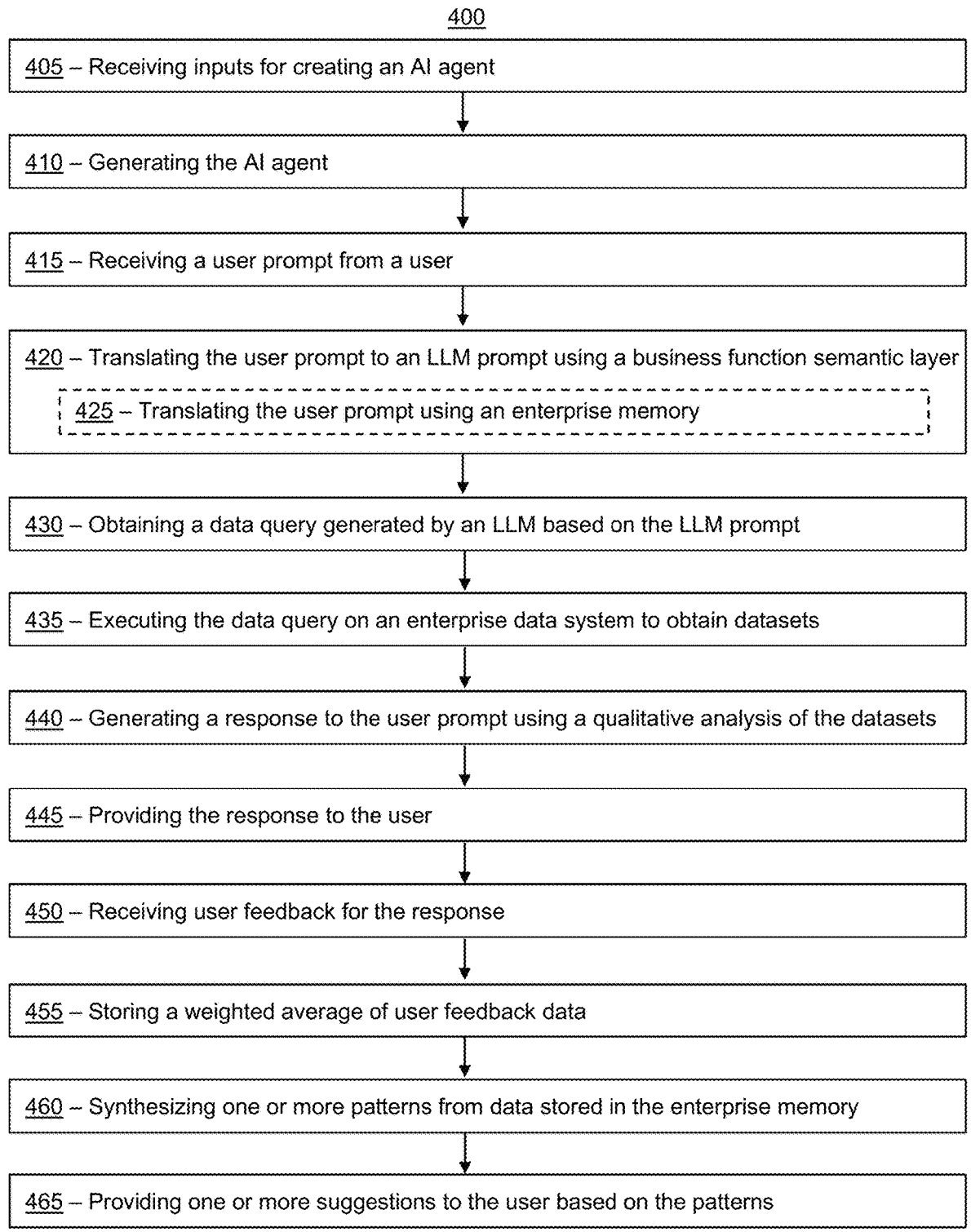
FIG. 4 illustrates a flowchart of a method for agentic AI creation, contextualized enterprise data interaction, and enterprise AI memory storage, according to an embodiments.

Turning ahead in the drawings, FIG. 4 illustrates a flowchart of a method 400 for agentic AI creation, contextualized enterprise data interaction, and enterprise AI memory storage, according to an embodiment. Method 400 is exemplary and is not limited to the embodiments presented herein. The method can be employed in a multitude of different embodiments or examples not specifically depicted or described in this disclosure. In some embodiments, the procedures, processes, and/or activities of method 400 can be executed in the sequence presented. In alternative embodiments, the procedures, processes, and/or activities of method 400 can be executed in another suitable order. In further embodiments, one or more of the procedures, processes, and/or activities of method 400 can be combined or omitted.

In various embodiments, system 300 (FIG. 3), enterprise system 310 (FIG. 3) can be suitably configured to perform method 400 and/or one or more of the activities of method 400. In these or other embodiments, one or more of the activities of method 400 can be implemented as computing instructions configured to execute on one or more processors and stored on one or more non-transitory computer-readable media. Such non-transitory computer-readable media can be part of system 300 (FIG. 3). The processor(s) can be similar or identical to the processor(s) described with respect to computer system 100 (FIG. 1).

Referring specifically to FIG. 4, method 400 can include an activity 405 of receiving, via an agentic AI creation studio, inputs for creating the AI agent. The agentic AI creation studio can be similar or identical to agentic AI creation studio 320 (FIG. 3). The inputs for creating the AI agent can be similar or identical to inputs provided in display screen 500 shown in FIG. 5 and described below. The includes can be selections related to the initial configuration and setup of an AI agent (e.g., 330 (FIG. 3)). In many embodiments, agentic AI creation studio 320 (FIG. 3) can provide a user interface to specify user-level, role-level, and/or admin-level controls, which can be displayed to the user (e.g., 381 (FIG. 3)) of agentic AI creation studio 320 (FIG. 3) based on the level of access of the user.

In some embodiments, the inputs can include selections for a name, a label, an agent type, a foundational model for an LLM, an embedding model, permitted users, and/or other suitable selections. In some embodiments, the agent type can be selected from options, such as general, numeric, and web crawler. In some embodiments, the agentic AI creation studio can include user-level access controls. In some embodiments, the inputs can specify one or more business functions. In some embodiments, the inputs can specify one or more enterprise knowledge bases.

In a number of embodiments, method 400 also can include an activity 410 of generating the AI agent based on the inputs received in activity 405. The AI agent generation can be similar or identical to the process performed by the agentic AI creation studio 320 (FIG. 3). In many embodiments, activity 410 can include the agentic AI creation studio initializing the configuration of the AI agent based on the inputs. The AI agent can be similar to conventional AI agents, but can be customized and tailored as described herein. A conventional AI agent, such as an Amazon Bedrock agent, typically functions as a cloud-based conversational AI assistant that utilizes large language models to comprehend and respond to user queries in natural language. Such AI agents are generally designed for broad use cases but can be somewhat customized for specific domains or tasks. They feature natural language processing capabilities and integrate with pre-defined APIs for data retrieval and action execution. They often come with predefined intents and response templates, and they can integrate with existing cloud services and databases. However, conventional AI agents tend to operate within the constraints of their initial configuration and training, with limited ability to evolve or adapt to complex enterprise-specific needs without significant manual intervention or retraining.

The AI agents (e.g., 330) generated in activity 410 can be customized to be significantly more adaptable and enterprise-focused than conventional AI agents. They can be created through the agentic AI creation studio that allows for fine-tuned configuration and customization. These AI agents can integrate deeply with the enterprise-specific knowledge bases and data systems, by using the business function semantic layer (e.g., 340 (FIG. 3)) to accurately interpret domain-specific language and concepts. The AI agents can utilize the enterprise memory (e.g., enterprise memory engine 350) that enables them to learn and evolve from interactions across the organization, which can provide context-aware and personalized responses. The AI agents can be tailored for specific types of tasks, such as general conversational interactions, complex numerical analysis, or web crawling, with each type optimized for its intended function. The AI agents can interact with multiple enterprise systems and APIs, allowing for more sophisticated and integrated operations. The AI agents can incorporate advanced governance and access control features, ensuring compliance with enterprise policies and data protection regulations. The AI agents can be dynamically updated and refined based on user feedback and changing business needs, without requiring extensive retraining or reconfiguration. The system also allows for the creation of multiple interconnected agents that can collaborate on complex tasks, providing a more comprehensive and scalable AI solution for enterprise environments.

As part of generating the AI agent, the agentic AI creation studio can connect the AI agent to specified enterprise knowledge bases, allowing access to relevant domain-specific information. A customized business function semantic layer (e.g., 340 (FIG. 3)) can be generated or assigned to the agent, enabling the AI agent to understand and interpret business-specific terminology and concepts. In some embodiments, the AI agent can be accessed through an interactive user interface (e.g., a chatbot interface), API calls, and/or an SDK (software development kit). API endpoints and service integrations are established by the agentic AI creation studio to enable the AI agent to interact with other enterprise systems and data sources. User-level access controls and permissions can be configured to limit the agent to operating within defined security boundaries. The agentic AI creation studio can generate or assign prompt templates tailored to the agent's specific type and intended functions. Depending on the configuration, the underlying language model can be fine-tuned on enterprise-specific data to enhance its domain relevance. The AI agent can be packaged and prepared for deployment within the enterprise environment, including any containerization or scaling configurations. The creation of the AI agent can be integrated into approval workflows if required by enterprise policies, completing the generation of a fully functional, enterprise-ready AI agent tailored to specific a business function and integrated with existing systems and data sources.

The AI agent output from the agentic AI creation studio can be an AI application generated as software code, which can allow for further customization. This software code can encapsulate the AI agent's functionality, including its integration with enterprise systems, semantic understanding capabilities, and specific task-oriented features. Users can specify the desired programming language for the generated code within the agentic AI creation studio, allowing for compatibility with existing enterprise development environments and skillsets. The resulting software code can be fully accessible and modifiable, which can enable developers to extend or refine the AI agent's capabilities beyond its initial configuration. This approach allows for fine-tuned adjustments, the addition of custom logic, and/or seamless integration with proprietary systems or algorithms. By providing the full source code, the agentic AI creation studio can empower enterprises to create highly tailored AI solutions that can evolve alongside their specific business needs and technical requirements.

In several embodiments, method 400 additionally can include an activity 415 of receiving, via the AI agent, a user prompt from a user. The user can be similar or identical to user 381 (FIG. 3) using user device 380 (FIG. 3), and can be a user of the AI agent, which can be a different user than the user of the agentic AI creation studio that generated the AI agent. In some embodiments, the user can be a human user, and the prompt can be received via a user interface of the AI agent, which can be similar to a chatbot interface. In other embodiments, the user can be an automated user, such as a task manager, and the prompt can be received through an API call or other suitable interface. The user prompt can be a query posed in natural language format and using business function-specific terms. As an example, a finance officer at a company that sells designer handbags, wallet, and shoes, such as the Tabby handbag, can ask the following prompt, "What drove Tabby sales in FY24Q1, and if it was a unique marketing campaign, can this be replicated in FY25Q3?"

In some embodiments, method 400 further can include an activity 420 of translating, via the AI agent, the user prompt to an LLM prompt using a business function semantic layer to interpret business function-specific language in the user prompt. The business function semantic layer can be similar or identical to business function semantic layer 340 (FIG. 3). In some embodiments, the business function semantic layer can include a system-level configuration file that provides interoperability with the LLM. In some embodiments, the business function semantic layer can be interoperable with multiple different LLMs. In some embodiments, the business function semantic layer cam ne configured to be refreshed at runtime.

In some embodiments, the translation process can use the business function semantic layer to convert the user prompt into a prompt suitable to be input into a standard LLM. This translation process involves interpreting the user prompt through the lens of domain-specific knowledge and terminology encoded in the business function semantic layer. The business function semantic layer helps contextualize the user prompt within the enterprise's specific business functions, industry jargon, and operational context. The business function semantic layer can map general terms to company-specific concepts and/or vice-versa, resolve ambiguities based on the business context, and/or enrich the prompt with relevant metadata. The translation process also can involve restructuring the user prompt to align with optimal or preferred input patterns for the LLM. The translation process can bridge the gap between the user's natural language input in the business context and the more structured, context-rich format used for effective interaction with the large language model, to enable more precise and business-relevant responses from the AI agent.

In some embodiments, activity 420 can include an activity 425 of translating the user prompt to the LLM prompt using an enterprise memory to provide user-specific and enterprise-wide AI interaction context. The enterprise memory can be similar or identical to enterprise memory engine 350 (FIG. 3). In some embodiments, the enterprise memory can store and/or synthesizes interactions across multiple AI agents comprising the AI agent and multiple users comprising the user. In some embodiments, the enterprise memory can include a short-term memory component and/or a long-term memory component. In some embodiments, the short-term memory component can be configured to store in-progress conversations and session-aware context for the user. In some embodiments, the long-term memory component can be configured to store persistent logs of user-agent interactions across sessions.

In some embodiments, the translation process in activity 425 can use the enterprise memory can involve accessing and analyzing historical interaction data, user preferences, and organizational knowledge stored in the enterprise memory. The enterprise memory can provide valuable context that can enhance the interpretation of the user's intent and tailor the response to the context and/or the user's specific intent. The AI agent can consider previous conversations with the same user, common patterns in similar queries across the organization, and relevant past outcomes or decisions. For example, if a user frequently asks about certain benchmarks, then the AI agent can learn that this user prefers to ask such questions. This memory-based translation also can help disambiguate unclear requests, anticipate user needs based on past behavior, and/or incorporate lessons learned from previous interactions. The enterprise memory also can allow the AI agent to maintain consistency across multiple conversations and users, enabling responses to align with established organizational knowledge and practices. By integrating this collective intelligence into the prompt translation process, the AI agent can generate more personalized, contextually appropriate, and organizationally aligned LLM prompts, which can provide more relevant and effective responses to user prompts.

In the process of handling user prompts in activities 420 and/or 425, the AI agent can use action groups to efficiently manage and execute complex tasks. There can be 1 to N action groups, depending on the situation. Action groups can work in collaboration to meet a certain task based on the user prompt, such as obtaining a response from a user prompt and synthesizing it. Action groups can be collections of pre-defined actions or subtasks that can be dynamically assembled and executed based on the nature of the user prompt. When a user prompt is received, the AI agent can analyze the prompt using the business function semantic layer and/or the enterprise memory and determine which action groups are most relevant. These action groups can be modular units of functionality that can be combined in various ways to address different aspects of the user prompt. For example, if a user asks about sales performance, the AI agent can activate action groups related to data retrieval, statistical analysis, and report generation. Each action group can contain multiple steps or API calls to complete its specific function. The use of action groups can enable modular task execution, breaking complex queries into manageable components, and/or can allow for the reusability of common task sequences across different types of queries. This approach can facilitate easier maintenance and updating of specific functionalities, while also enabling parallel processing of independent subtasks for improved efficiency. Additionally, action groups can provide flexibility in combining different capabilities to address novel user requests, which can enhance the AI agent's adaptability to diverse and evolving user needs. As the AI agent processes the user prompt, it can dynamically sequence and execute these action groups, coordinating their outputs to generate a comprehensive response. This approach can enable the AI agent to handle a wide range of complex, multi-step tasks while maintaining a flexible and extensible architecture.

In a number of embodiments, method 400 also can include an activity 430 of obtaining a data query generated by an LLM based on the LLM prompt. The LLM can be similar or identical to LLM 360 (FIG. 3). In many embodiments, the data query can be SQL code or another suitable type of data query. In a number of embodiments, the AI agent can sent the LLM prompt to the LLM. The LLM can interpret the LLM prompt and generate a structured query designed to retrieve relevant information from an enterprise data system, such as enterprise data system 370 (FIG. 3). The data query is typically formulated as SQL code designed to extract relevant information from the enterprise data system. The LLM can use its training and the context provided in the prompt to construct a query that accurately reflects the information requested from the enterprise's data structure. By utilizing the LLM to generate the query, the system can handle complex, natural language requests and translate them into precise, executable database queries, bridging the gap between human language and machine-readable instructions for data retrieval.

In some embodiments, a proprietary purpose-build AWS (Amazon Web Services) Lambda function or a Microsoft Azure function can be used in preparing or processing the LLM prompt in activities 420 and/or 425 and/or in processing the data query obtained from the LLM in activity 430 to structure it for querying the enterprise data system, In some embodiments, activities 420 and/or 425 can involve generating multiple LLM prompts, such as 3-5 different LLM prompts, and/or activity 430 can involve obtaining multiple data queries from the LLM based on the LLM prompt, such as 3-5 data queries.

In several embodiments, method 400 additionally can include an activity 435 of executing the data query on an enterprise data system to obtain datasets responsive to the data query. The enterprise data system can be similar or identical to enterprise data system 370 (FIG. 3). Activity 435 can involve the AI agent running the data query, such as SQL code against the enterprise databases, data warehouses, or other data repositories to extract the requested information. This process can involve taking the structured query, such as in SQL format, generated by the LLM and running it against the enterprise data repositories. The enterprise data system can include various databases, data warehouses, or other data storage solutions used by the enterprise. During this execution, the system can apply appropriate access controls and data governance policies to limit retrieval of data to data for which the user has access. The query execution can involve complex joins across multiple tables, aggregations, or other data operations as specified in the SQL code. Depending on the nature of the query and the size of the dataset, this process can utilize distributed computing resources for efficient processing. The resulting datasets are then collected and prepared for further analysis. This process can provide the data to provide a quantitative analysis responding to the user's high-level inquiry, which can enable the AI agent to work with relevant, up-to-date information in formulating its response.

In some embodiments, method 400 further can include an activity 440 of generating a response to the user prompt using a qualitative analysis of the datasets. Activity 440 can involve processing and interpreting the retrieved datasets to formulate a meaningful answer to the user prompt, based on the enterprise memory. The AI agent can synthesize the knowledge it has, to provide a comprehensive answer responding to the user prompt. In many embodiments, the AI agent and/or the action groups can make calls to the LLM to generate a curated and synthesize quantitative and qualitative response to the user prompt. The AI agent can use its understanding of business context, historical data, and enterprise-specific knowledge to provide insights and recommendations based on the analysis. This process can involve interpreting and synthesizing the dataset into meaningful insights that directly address the user prompt. The AI agent can use various analytical techniques to extract relevant patterns, trends, and correlations from the datasets. It can compare current data with historical information to identify significant changes or anomalies. The analysis can involve statistical methods, data visualization techniques, or machine learning algorithms to derive deeper insights from the data. The AI agent can use its understanding of the business context, provided by the business function semantic layer, to frame the analysis in terms relevant to the user's role and the specific business domain. The AI agent can consider factors such as industry benchmarks, company-specific KPIs, or strategic objectives when interpreting the data. The AI agent also can draw upon the enterprise memory to incorporate learnings from past interactions or decisions related to similar queries.

In generating the response, the AI agent can prioritize information based on its relevance and importance to the user prompt. It may provide explanations for its findings, offer recommendations based on the data analysis, and highlight any limitations or assumptions in its interpretation. The response can include both quantitative results and qualitative insights, presented in a format that is easily understandable and actionable for the user. If the analysis reveals additional questions or areas that may involve further investigation, the AI agent can suggest follow-up queries or areas for deeper analysis. The generated response can answer the user prompt and, in some cases, can provide context and insights that support informed decision-making within the enterprise environment.

In activity 440, the LLM can be used to generate the response by synthesizing the qualitative analysis of the datasets into a coherent, natural language output tailored to the user prompt. The LLM can be called with datasets, relevant context from the business function semantic layer, and any pertinent information from the enterprise memory as inputs. It can then formulate a response that explains the findings, provides insights, and addresses the user prompt in a clear and contextually appropriate manner. The natural language generation capabilities of the LLM enable it to present complex data analysis in an easily understandable format, such as explanations of trends, comparisons to historical data, and recommendations based on the insights gained. The LLM also can adapt its language and level of detail to suit the user's role and expertise, to provide a response that is relevant and accessible. This process can use the LLM's ability to understand context, generate human-like text, and present information in a logical and engaging way to provide the user with a comprehensive and actionable response to their initial prompt. In some embodiments, such as when multiple LLM prompts and/or data queries are used, a median response can be generated based responses from the data queries. If the dataset received in response is valid, then the query is good, and it can be added to a layer 3 (L3) cache. This process of generating the response can be performed without using a RAG, without training the model with the business context, and/or without including the business context in the LLM prompt.

In various embodiments, method 400 also can include an activity 445 of providing the response to the user. Activity 445 can involve presenting the generated response through the same interface used to receive the initial prompt, such as a chatbot interface for human users or an API response for automated systems.

In some embodiments, a purpose-build export function can be available to export the response and/or the datasets as a document, such as in a PDF (Portable Document Format) format or another suitable format. In some cases, this export function can involve the AI agent and/or LLM to generate the document, which can return the document, such as a pre-signed S3 (AWS Simple Storage Service) URL (uniform resource locator) for the user to download.

In several embodiments, method 400 additionally can include an activity 450 of receiving, via the AI agent, user feedback for the response. The user feedback can capture the user's reaction to the provided response, which can include ratings (e.g., like/dislike, numerical rating, or other suitable rating), comments, and/or follow-up questions. The feedback mechanism can be integrated into the user interface of the AI agent, which can provide seamless collection of user input. For automated systems, this feedback can be in the form of programmatic responses or metrics indicating the utility of the provided information. The feedback can be valuable for improving the AI agent's performance and refining its understanding of user needs and preferences.

In some embodiments, method 400 further can include an activity 455 of storing a weighted average of user feedback data, such as including the user feedback obtained in activity 450, in the enterprise memory. This process can involve aggregating feedback from multiple interactions, across different users and queries, to create a comprehensive picture of the AI agent's performance. The weighting mechanism can prioritize more recent feedback or feedback from users with higher expertise levels in certain domains. This stored feedback data can be used to fine-tune the AI agent's responses, update the business function semantic layer, and/or improve the overall quality of interactions over time.

In many embodiments, method 400 also can include an activity 460 of synthesizing one or more patterns from data stored in the enterprise memory. Activity 460 can involve analyzing the accumulated data, including user interactions, feedback, and query patterns, to identify trends, common issues, or areas of high interest within the organization. The AI agent can use machine learning algorithms to detect these patterns, which can reveal insights about user behavior, frequently asked questions, or emerging topics of importance within the enterprise. This synthesis can help in proactively improving the AI agent's capabilities and aligning its knowledge base with evolving organizational needs.

In various embodiments, method 400 additionally can include an activity 465 of providing one or more suggestions to the user based on the patterns. These suggestions can be proactive recommendations that go beyond the initial user prompt, leveraging the insights gained from pattern synthesis. For example, the AI agent can suggest related queries that other users found helpful, recommend resources based on the user's role and recent interactions, or highlight trending topics relevant to the user's area of interest. This feature can enhance the user experience by providing additional value and guiding users towards more comprehensive understanding or efficient problem-solving within their business context.

The suggestions provided in activity 465 can be tailored to the user's specific role, historical interactions, and/or current context within the enterprise. The suggestions can include recommendations for further analysis, potential collaborations with other departments, or alerts about relevant upcoming events or deadlines. By offering these proactive suggestions, the AI agent can transition from a reactive query-response system to a more dynamic, anticipatory tool that actively supports users in their decision-making processes and workflow optimization.

The techniques described herein can provide significant improvements in AI performance over traditional text-to-SQL platforms. A multi-turn conversation, described below, was conducted using the techniques described herein in which a conversational context-based business analytics AI agent was generated to interpret sales performance, customer trends, and product-level dynamics for a specific product line. The AI agent's ability was assessed to determine is ability to go beyond traditional text-to-SQL functions by synthesizing insights, forecasting risk, evaluating trade-offs, and recommending business actions based on structured data and general knowledge. The outputs were compared with what would be expected from a generally available text-to-SQL platform, which translates plain English into SQL queries over a structured database schema (e.g., platforms found in major analytics or cloud services tools). The side-by-side evaluation described in Tables 1-4 below is grounded in a real-world scenario, focusing on a multi-turn dialogue involving performance analysis, forecasting, strategic planning, and general knowledge integration. The AI agent under evaluation demonstrated capabilities far beyond standard query generation. It acted as a strategic thought partner, by interpreting trends, quantifying risks, recommending data-driven actions, and applying external business learnings to evolving challenges. Unlike traditional text-to-SQL systems, which retrieve isolated facts from structured data, this AI agent maintained context, reasoned over time, understood nuanced business language, and provided actionable insights. This shift from transactional querying to contextual strategic support represents a technical improvement in AI capability.

TABLE 1

Depth of Analysis and Contextual Reasoning

| Feature | AI Agent | Text-to-SQL Platform |
|---|---|---|
| Trend Understanding | Interprets deceleration patterns, low base effects, pricing pressure, and customer acquisition trends across quarters. | Can return growth numbers, but user must analyze and interpret reasons. |
| Cross-Quarter Analysis | Synthesizes historical data across the given financial year to explain normalization trends. | Treats each query independently; requires manual tracking across time. |
| Revenue Impact Forecasting | Quantifies future revenue impact based on ongoing deceleration, contextualizing significance (<X.X % of total revenue). | Cannot simulate forward projections without user-defined models. |
| Segment Prioritization | Recommends high-potential segments with reasoning based on [specific generation-based demographic A] growth, margin, and past performance. | Lists under-performing segments; offers no rationale or prioritization. |
| Multi-Turn Contextual Memory | Carries insights across prompts, forming a narrative from diagnosis to action. | Stateless—each question must be complete and self-contained. |

TABLE 2

Language Understanding and Strategic Reasoning

| Feature | AI Agent | Text-to-SQL Platform |
|---|---|---|
| Business Language Fluency | Understands retail-native concepts like Average Unit Revenue, Average Dollars per Transaction, customer penetration, seasonal planning, and inventory mix. | Requires specific schema names and simplified metrics to query. |
| Strategic Framing | Suggests tactical actions based on product/channel/customer mix and phases them over time. | Limited to descriptive reporting; no planning or sequencing capabilities. |
| Trade-off Analysis | Evaluates pricing vs. volume, product expansion vs. focus, and growth vs. profitability across 12-month horizons. | No awareness of trade-offs— operates at the data access layer only. |
| Temporal Thinking | Recommends decisions phased over short (current quarter), medium | Requires separate user queries and manual synthesis |

TABLE 2-continued

Language Understanding and Strategic Reasoning

| Feature | AI Agent | Text-to-SQL Platform |
|---|---|---|
|  | (next 6 months), and long term (the subsequent financial year), adapting to changing momentum. | for planning. |

TABLE 3

Actionability and Strategic Outcomes

| Feature | AI Agent | Text-to-SQL Platform |
|---|---|---|
| Actionable Recommendations | Provides specific, data-grounded initiatives—e.g., "Scale product in outlet," "Reallocate spend to [specific generation-based demographic A] channels," etc. | Delivers data output only—decision-making left entirely to the user. |
| Cross-functional Insight | Links product, marketing, pricing, and operations for integrated recommendations. | Focuses on structured query output; no organizational context. |
| Customer Strategy | Identifies [specific generation-based demographics A and B] as growth levers, suggesting tailored acquisition and retention strategies. | Can show demographic data if asked, but does not interpret or suggest strategy. |

TABLE 4

General Knowledge Integration and Learning Transfer

| Feature | AI Agent | Text-to-SQL Platform |
|---|---|---|
| External Benchmarking | Pulls lessons from fashion brands (e.g., diversification, tiered pricing) and applies them to the product line. | Operates strictly within enterprise database—no external context. |
| Analogy and Knowledge Transfer | Applies general business strategies (portfolio balance, loyalty programs, seasonal optimization) to current state. | Unable to reason beyond raw data output. |
| Open-Ended Reasoning | Responds to prompts like "What can the product line learn from other brands?" with layered, domain-aware insights. | Does not support non-quantifiable reasoning or synthesis. |

The evaluation results displayed above in Tables 1-4 demonstrate that the tested conversational AI system provided by the AI agent functions far beyond the scope of traditional text-to-SQL tools. It operates as a context-aware, business-literate strategist, capable of interpreting multi-dimensional data across time and product hierarchies; synthesizing business logic, customer behavior, and sales performance, making forward-looking, phase-based recommendations grounded in both data and domain knowledge; and integrating general business wisdom and analogical reasoning from other industry players. By contrast, generally available text-to-SQL platforms are powerful at translating specific user queries into SQL, but lack memory, abstraction, reasoning, and action generation. The new capability provided by the AI agent constitutes a paradigm shift from query automation to conversational business intelligence, allowing the AI agent to perform strategic interpretation and action planning directly from natural language conversation.

The following transcript illustrates the multi-turn conversation between a user and the AI agent (which provides conversational context-based business analytics AI). This conversation demonstrates the AI agent's ability to understand structured data, reason over multiple dimensions, and provide data-driven business recommendations. Note that some information from the conversation has been changed to not show the actual numbers, product lines, etc.

User Prompt:
    What was the biggest contributor to growth for the product line in the past quarter
AI Agent Response:
Product Metrics:
    1. Core Metrics Performance:
        Overall sales grew from $XXX M to $YYY M, representing a $ZZZ M (+PPP %) increase year over year
    2. Top Growth Contributors:
        a. Channel Growth:
            Retail channel was the primary driver with $XXX M growth (PPP % increase year over year)
            Outlet channel contributed $YYY M in growth
        b Product Contributors:
            Product A showed the highest individual product growth: +$XXX M
            Product B: +$YYY M
            Product C: +$ZZZ K
        c. Customer Growth:
            New customer sales grew by $XXX M (+PPP % year over year)
Citations:
    Region: North America, Excluded: Porter, Uncaptured, Employee transactions and System Fraud Rejections.
    Channel: Retail only as the product line is a retail-only collection
    Data filtered for [product line in the past quarter]
    Growth calculations based on Sales TY vs Sales LY comparisons from the provided data
User Prompt:
    Based on historical data, do you think the top growth contributor for the product line in the past quarter will continue to perform strongly over the next two quarters? Why or why not?
AI Agent Response:
    Based on the historical data, Product A's strong performance is likely to moderate in the coming quarters for several reasons:
    1. Growth Rate Deceleration:
        The year-over-year growth rate has been declining from XXX % in Q1 to YYY % in Q4
        Similar deceleration is seen in the broader collection (XXX % to YYY %)
    2. Customer Acquisition Trends:
        New customer acquisition growth is showing similar deceleration
        Product A: from XXX % growth in Q1 to YYY % in Q4
        Overall collection: from XXX % to YYY % in Q4
    3. Price Position:
        The product's Average Unit Revenue price has declined from $XXX to $YYY
        This suggests potential promotional activity or price pressure
    While the product remains strong, the dramatic growth rates seen in the past quarter appear to be partly due to a low base period, and the subsequent quarters show a clear normalization pattern.

Citations:
  Data filtered for North America region, excluding fraud transactions and Porter/Uncaptured/Employee customers
  Analysis based on trailing 4 quarters performance data for the collection
  Average Unit Revenue metrics comparison between Product A and overall collection
User Prompt:
  Which underperforming segments show the most potential to offset this slowdown if investments are reallocated now?
AI Agent Response:
  Based on the data, here are the segments with the highest potential to offset the slowdown:
  1. Product D:
    Highest growth contribution (XXX % of total growth)
    New [specific generation-based demographic A] customer penetration of XXX %
    Untapped potential with room for [specific generation-based demographic A] expansion compared to other subcollections
  2. Product E:
    Strong year over year growth (XXX-YYY % across colors)
    Healthy [specific generation-based demographic A] penetration growth (+XXX % year over year)
    Strong customer acquisition (XXX-YYY % growth across colors)
    Currently only XXX % of growth contribution, indicating room for expansion
  3. Product F:
    Second-highest growth contribution (XXX %)
    Highest absolute [specific generation-based demographic A] customer count (XXX)
    Strong Average Unit Revenue maintenance ($XXX-YYY)
    Proven success with both new and existing customers
Investment Priorities:
  1. Expand Product D's [specific generation-based demographic A] marketing and distribution
  2. Scale Product E's successful color variants (particularly [color 1] and [color 2]
  showing >XXX % growth) 3. Leverage Product F's established customer base for cross-selling Citations:
    Data filtered for North America region, excluding Porter/Uncaptured/Employee transactions
    Growth contribution analysis based on current quarter performance
    [specific generation-based demographic A] penetration data across subcollections
User Prompt:
  Based on the insights we've discussed so far, along with recent sales, inventory levels, and campaign performance—what specific actions should the product line prioritize in Q4 to drive the highest ROI?
AI Agent Response:
  Based on the comprehensive analysis, here are the priority actions for Q4 to drive highest ROI:
  1. Immediate Priority Actions:
    Expand Product F new customer acquisition
      Highest new customer penetration (XXX %)
      Strong year over year growth (YYY % customer growth)
      Proven success in both retail and outlet channels
  2. Growth Optimization:
    Scale Product D distribution
      Strong initial performance with XXX new customers
      YYY % new customer penetration
      Opportunity to expand channel presence
  3. Channel-Specific Strategy:
    Leverage Product E in outlet channel
      Highest outlet growth contribution (XXX %)
      YYY % year over year customer growth
      Focus on inventory optimization for outlet channel
  4. Customer Acquisition Focus:
    Prioritize [specific collection 1] expansion
      Second-highest new customer count (XXX)
      Stable new customer penetration (YYY %)
      Strong performance in both channels
Citations:
  Data filtered for North America region, current quarter performance
  Analysis based on new customer acquisition metrics and channel growth contribution
  Customer penetration and sales performance across subcollections
User Prompt:
  If the product line wants to exceed the coming year's growth expectations while improving profitability, what trade-offs should it consider across product, pricing, and channel strategy—and how should those decisions be phased over the next 12 months?
AI Agent Response:
  Based on the current performance data, here are the strategic trade-offs and phasing recommendations for the product line:
  1. Product Strategy Trade-offs (0-6 months):
    Prioritize expansion of the Product F and Product D collections, which show strong performance (Product F: +XXX % sales growth, Product D: strong new collection launch)
    Gradually phase out or redesign Product G, which shows negative growth (-YYY %)
    Focus on [specific collection 1]'s steady performance (+XXX % growth) while improving its growth trajectory
  2. Pricing Strategy Trade-offs (3-9 months):
    Build on the positive Average Unit Revenue trends (+XXX % year over year, from $YYY to $ZZZ)
    Implement tiered pricing strategy across subcollections:
      Premium positioning for high-performing Product D and Product F
      Maintain current pricing for [specific collection 1] given its stable performance
      Consider promotional strategies for [specific collection 2] to improve velocity
  3. Channel Strategy Trade-offs (6-12 months):
    Leverage strong retail contribution (XXX % of retail growth)
    Focus on improving transaction value (Average Dollars per Transaction up XXX % year over year to $YYY)
    Capitalize on strong customer growth (+ZZZ % year over year) through targeted expansion
  4. Customer Segment Prioritization:
    Primary focus on [specific generation-based demographics A and B] segments showing strongest growth:
      [specific generation-based demographic A]: XXX % total customer growth, YYY % new customer growth

Figure 5:
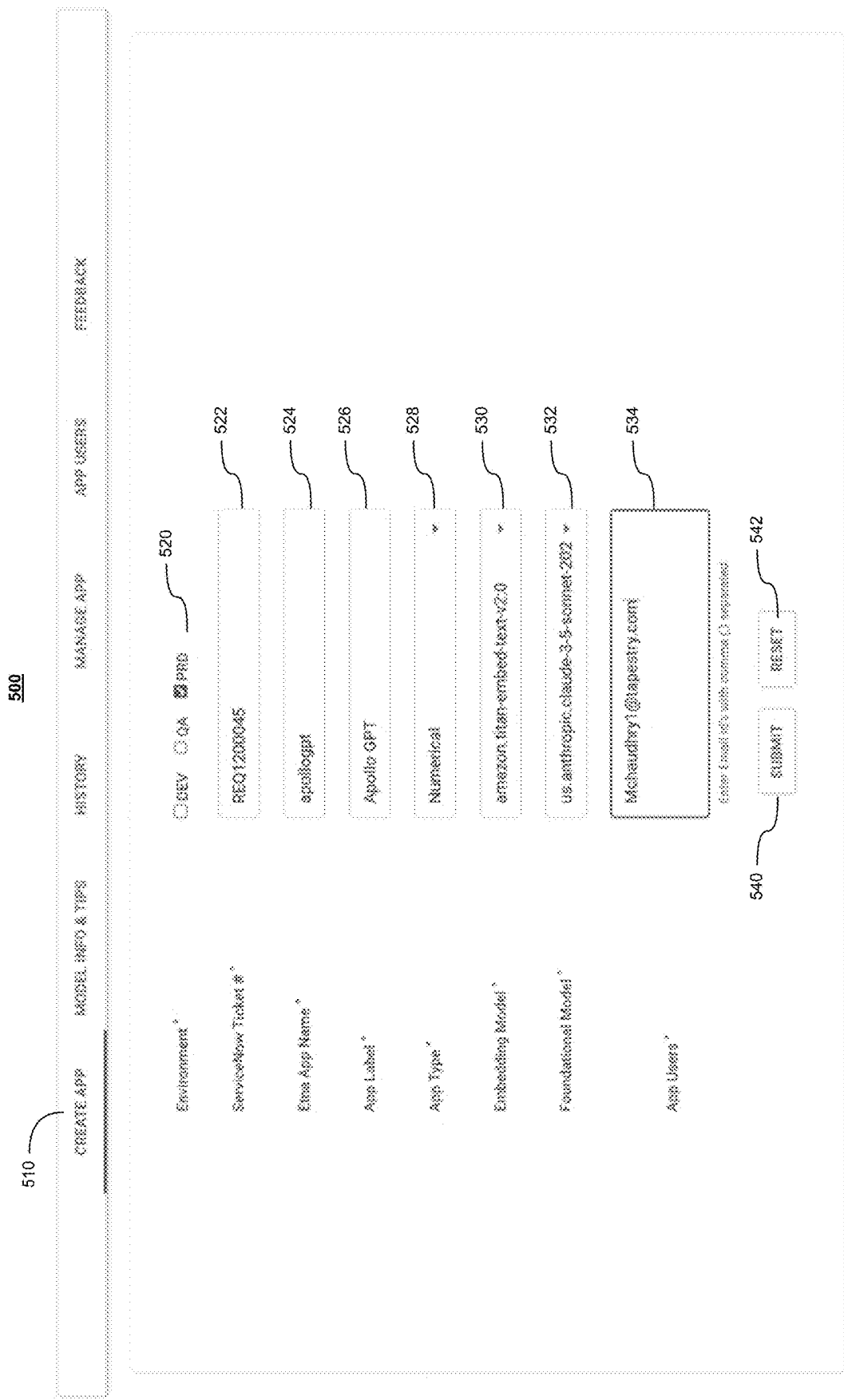
FIG. 5 illustrates a display screen of the user interface for creating an AI application.

[specific generation-based demographic B]: XXX % total customer growth, YYY % new customer growth
Secondary focus on [specific generation-based demographic C] showing moderate growth potential
Citations:
Region: North America, Excluded: Porter, Uncaptured, Employee transactions and System Fraud Rejections. Channel: Retail only as the product line is a retail-only collection
Core metrics performance data showing year over year growth in customers (XXX %), sales (YYY %), and pricing metrics
Subcollection performance data showing varying growth rates across product lines
Customer age segment analysis showing growth rates across different demographics
User Prompt:
What can the product line learn from other successful fashion or retail brands that have maintained growth after a product line plateaued? How might those lessons apply to the product line's strategy going forward?
AI Agent Response:
Based on the product line's current performance data, here are key strategic lessons and applications:
1. Portfolio Diversification Strategy
   Current State: Heavy reliance on Product F (XXX % growth contribution) and Product D (YYY % growth contribution)
   Forward Strategy:
     Develop complementary product lines while maintaining core offerings
     Use successful Product D launch (new collection) as template for future innovations
     Address underperforming lines like Product G (-ZZZ % growth contribution)
2. Customer Segment Expansion
   Current Strength: Strong [specific generation-based demographic A] growth (XXX % total customer growth) and [specific generation-based demographic B] (YYY % growth)
   Application:
     Develop targeted products for high-growth segments while maintaining broad appeal
     Balance new customer acquisition (showing strong growth across segments) with retention
     Create segment-specific marketing and product strategies
3. Price Architecture Evolution
   Current Performance: Positive Average Unit Revenue trends (+XXX % year over year) with strong Average Dollars per Transaction growth (+YYY %)
   Strategic Application:
     Maintain premium positioning while introducing entry-point products
     Use successful subcollections (Product D, Product F) to test higher price points
     Implement tiered pricing across product lines
4. Seasonal Planning Optimization
   Current Challenge: [specific collection 2] showing mixed performance
   Implementation:
     Reduce dependency on [specific collection 2]
     Focus on year-round core products with seasonal color/material updates
     Better align launch timing with customer purchase patterns Citations:
Quarterly performance data showing consistent growth across four quarters
Subcollection contribution analysis showing varied performance across product lines
Customer demographic data showing strong growth in key segments
Core metrics showing positive pricing and transaction value trends Turning ahead in the drawings, FIGS. 5-10 show display screens of an example of a user interface of an agentic AI creation studio (e.g., 320 (FIG. 3)). FIG. 5 illustrates a display screen 500 of the user interface for creating an AI application. Display screen 500 can include a create app tab 510 that, when selected, displays various input fields and selectors for configuring the AI application. Display screen 500 also can include an environment selector 520, which can allow user to choose between different environments for the application deployment, such as a development (DEV) environment, a quality assurance (QA) environment, or a production (PRD) environment. Display screen 500 also can include a ticket identifier field 522 for displaying or entering a service ticket number associated with the application creation request.

Display screen 500 also can include an application name field 524, which can allow the user to specify the name of the AI application being created. Display screen 500 can include an application label field 526, in which a user can enter a label for the application, which may be used for identification or categorization.

Display screen 500 also can include an application type selector 528, which can allow the user to select the agent type of the AI agent, based on intended functionality. For example, the agent types can be General, Numeric, or Web Crawler. In the context of AI agent creation, different agent types can be offered to cater to specific use cases and functionalities.

A general agent can be specialized for versatile natural language processing and generation tasks. This type of agent can handle a wide range of queries and conversations across various domains. It can excel at tasks such as answering general business knowledge questions, providing explanations and summaries, engaging in open-ended conversations, offering basic business task assistance and recommendations, handling customer service inquiries, etc. General agents can rely primarily on their pre-trained knowledge and the business function semantic layer to interpret and respond to prompts. This type of AI agent can be qualitative.

A numeric agent can be specialized for quantitative analysis and data-driven tasks. This type of agent can be particularly useful for financial, scientific, or business intelligence applications. Capabilities of a numeric agent can include performing complex calculations and statistical analysis, generating data visualizations and reports, forecasting and trend analysis, financial modeling and scenario planning, interpreting and explaining numerical data, etc. Numeric agents can incorporate additional components like SQL engines or specialized mathematical libraries to enhance their quantitative capabilities. In many embodiments, numeric agents can use multiple agents, include a text-ot-SQL convertor, custom fonds, and a robust semantic layer, as LLMs are generally not designed to solve quantitative analysis.

A web crawler agent can be specialized to search, retrieve, and analyze information from online sources, such as provided a customized search engine for the enterprise. This type of agent can be valuable for research, competitive intelligence, or content aggregation tasks. Features of a web crawler agent can include searching and indexing web pages based on specific criteria, extracting structured data from websites, monitoring websites for changes or updates, aggregating content from multiple sources, performing sentiment analysis on online content, etc. Web crawler agents can integrate with external APIs. In some embodiments, web crawler can provide both quantitative and qualitative analysis.

Display screen 500 also can include an embedding model selector 530 for choosing the embedding model to be used in the application (e.g., how the data is stored in vector store and SQL engine), and a foundational model selector 532 for selecting the underlying language model (e.g., LLM model).

Display screen 500 also can include a user field 534, which can allow the user to specify which users will have access to the AI agent application. In some embodiments, identifiers (e.g., email addresses) of individual users can be entered. In other embodiments, criteria can be entered. This field may support multiple entries for granting access to various team members or stakeholders. In some embodiments, the creation interface can allow the user to specify which business function or knowledge bases are to be used, or this information can be inferred from other inputs.

Display screen 500 also can include a submit button 540 for sending the application creation request with the entered inputs, and a reset button 542 for clearing all entered values and returning the form to its initial state.

Figure 6:
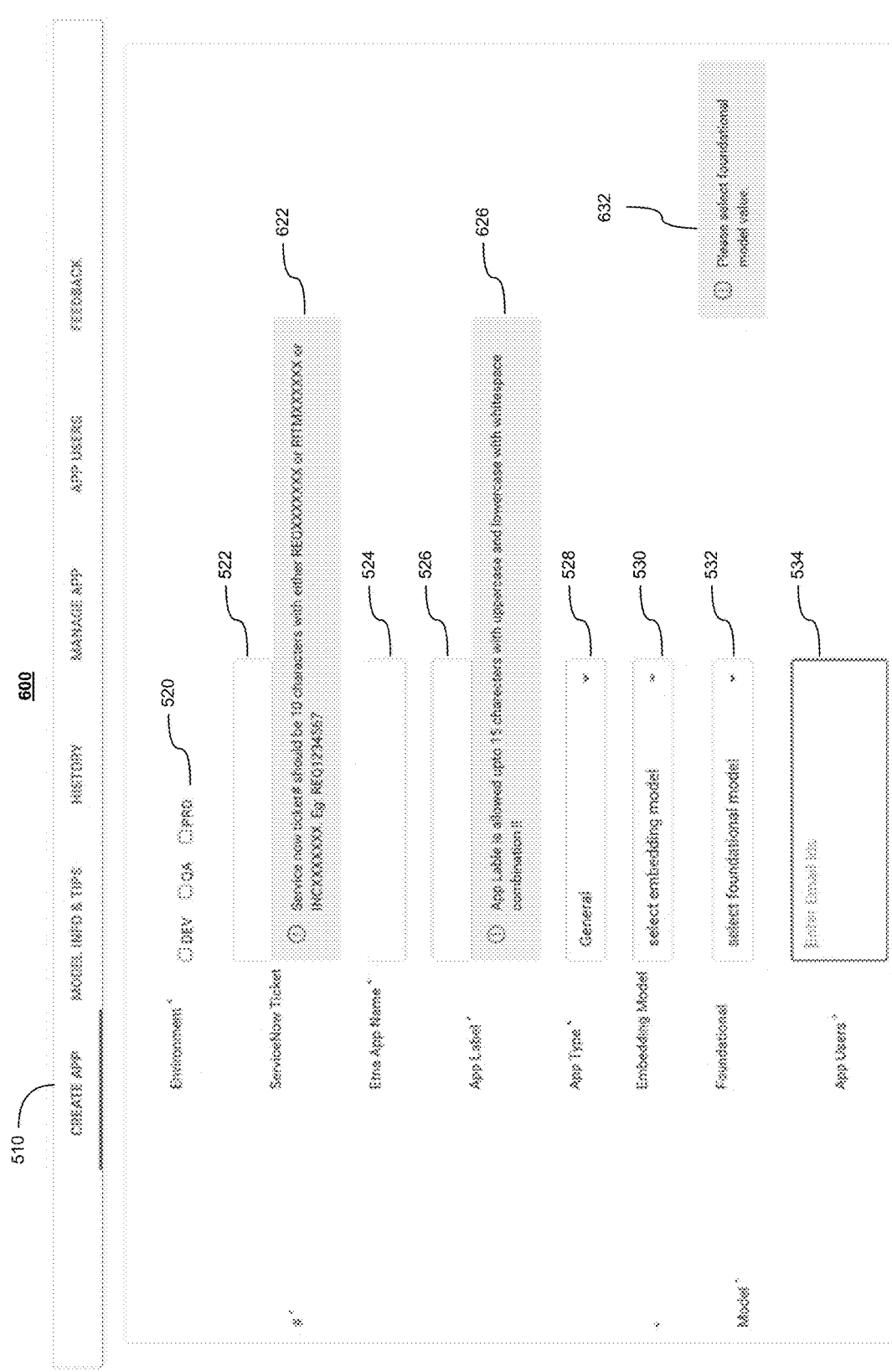
FIG. 6 illustrates a display screen of the user interface, showing an update of display screen of FIG. 5 for creating an AI application, but with error messages.

FIG. 6 illustrates a display screen 600 of the user interface, showing an update of display screen 500 for creating an AI application, but with error messages. Display screen 600 can include create app tab 510 and the selectors and fields shown in FIG. 5.

Display screen 600 also can include a ticket error message 622, which can be associated with ticket identifier field 522, and which can provide guidance on the required format for the ticket identifier. This error message can help ensure that users input valid ticket numbers, facilitating proper tracking and management of application creation requests.

Display screen 600 also can include a label error message 626, which can be associated with application label field 526 and which can specify character limitations for the label. This error message can guide users in creating concise and standardized labels for easy categorization and searching of applications.

Display screen 600 also can include a foundational model error message 632, which can be associated with foundational model selector 532 and which can appear when a foundational model value has not been selected.

Figure 7:
FIG. 7 illustrates a display screen of the user interface showing model information and capabilities.

FIG. 7 illustrates a display screen 700 of the user interface showing model information and capabilities. Display screen 700 can include a model information tab 710 that presents details about different models and their characteristics available within the agentic AI creation studio, which can assist users to identify and select the appropriate base model for their AI application needs.

Display screen 700 can be organized into multiple columns to provide a comprehensive overview of the available models. Display screen 700 can include a foundational model column 720, which can list various model types available in the system; a model version column 722, which can specify the version information for each corresponding model (e.g., for tracking and selecting specific iterations of models, for compatibility and access to certain features); a features column 724, which can provide information about the distinct capabilities and language support for each model version; and an applications column 726, which can describe the supported use cases and applications for each model and version combination. This information in display screen 700 can be particularly useful for users who are not AI developers, to help them understand the strengths and limitations of each model, facilitating informed decision-making when selecting a model for their application, and quickly identify which models are best suited for their specific business needs and intended application functionality.

Figure 8:
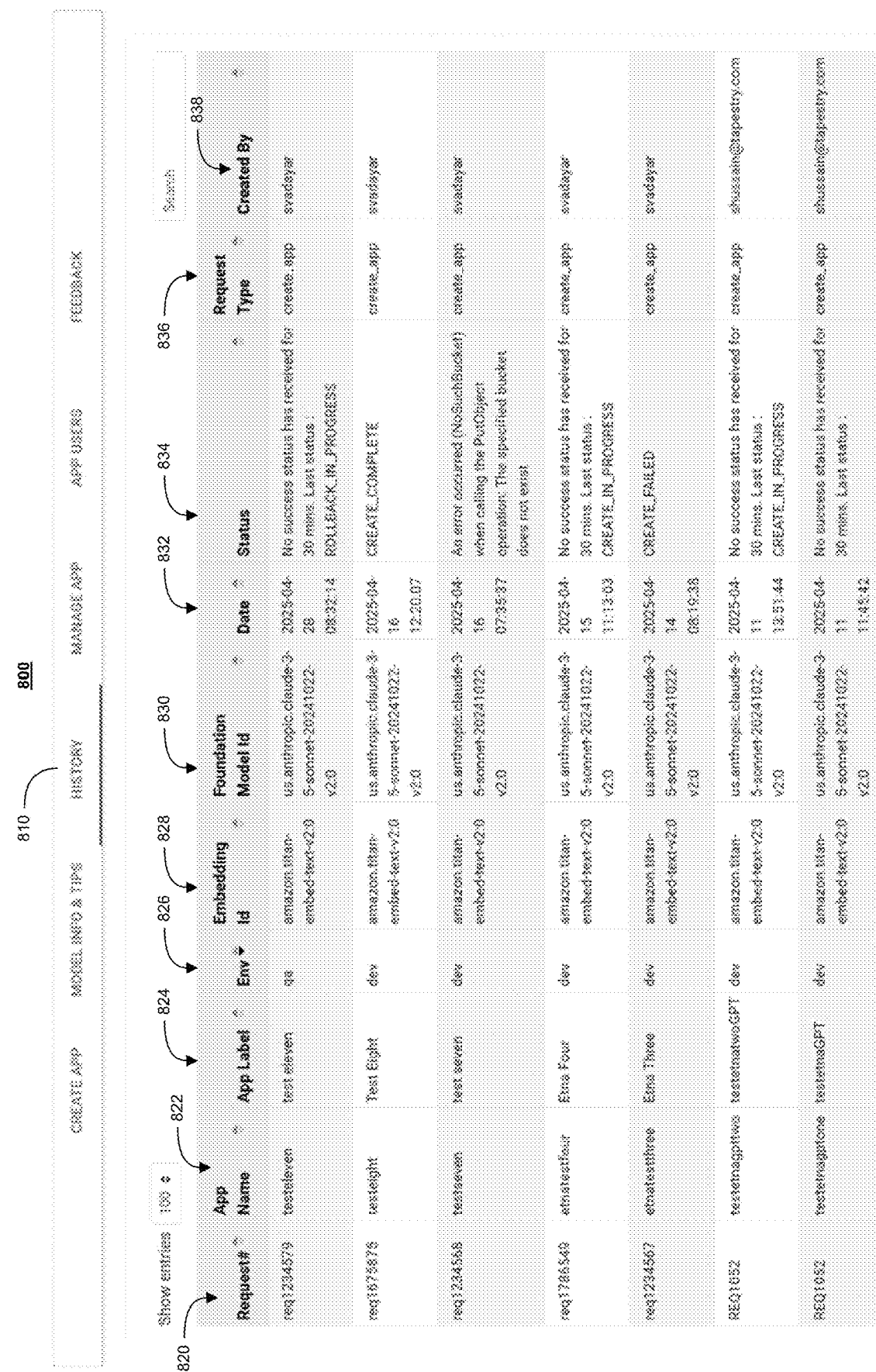
FIG. 8 illustrates a display screen of the user interface showing a history tab that presents information about AI application creation requests.

FIG. 8 illustrates a display screen 800 of the user interface showing a history tab 810 that presents information about AI application creation requests. Display screen 800 can include multiple columns for organizing and displaying request information, providing users with a comprehensive overview of the AI application creation activities within the agentic AI creation studio.

Display screen 800 can include multiple columns, such as a request identifier column 820, which can show unique identifiers for each request; an application name column 822, which can displaying the names of applications; an application label column 824, which can show labels associated with each application; an environment column 826, which can indicate the deployment environment for each application; an embedding identifier column 828, which can display the embedding model identifiers; a foundational model column 830, which can show the foundational model information for each application; a date column 832, which can show when each request was made; a status column 834, which can display the current status of each request (e.g., creation complete, in progress, create failed, etc.); a request type column 836, which can indicate the type of request made (e.g., create app, etc.), and/or a creator column 838, which can show who initiated each request.

Figure 9:
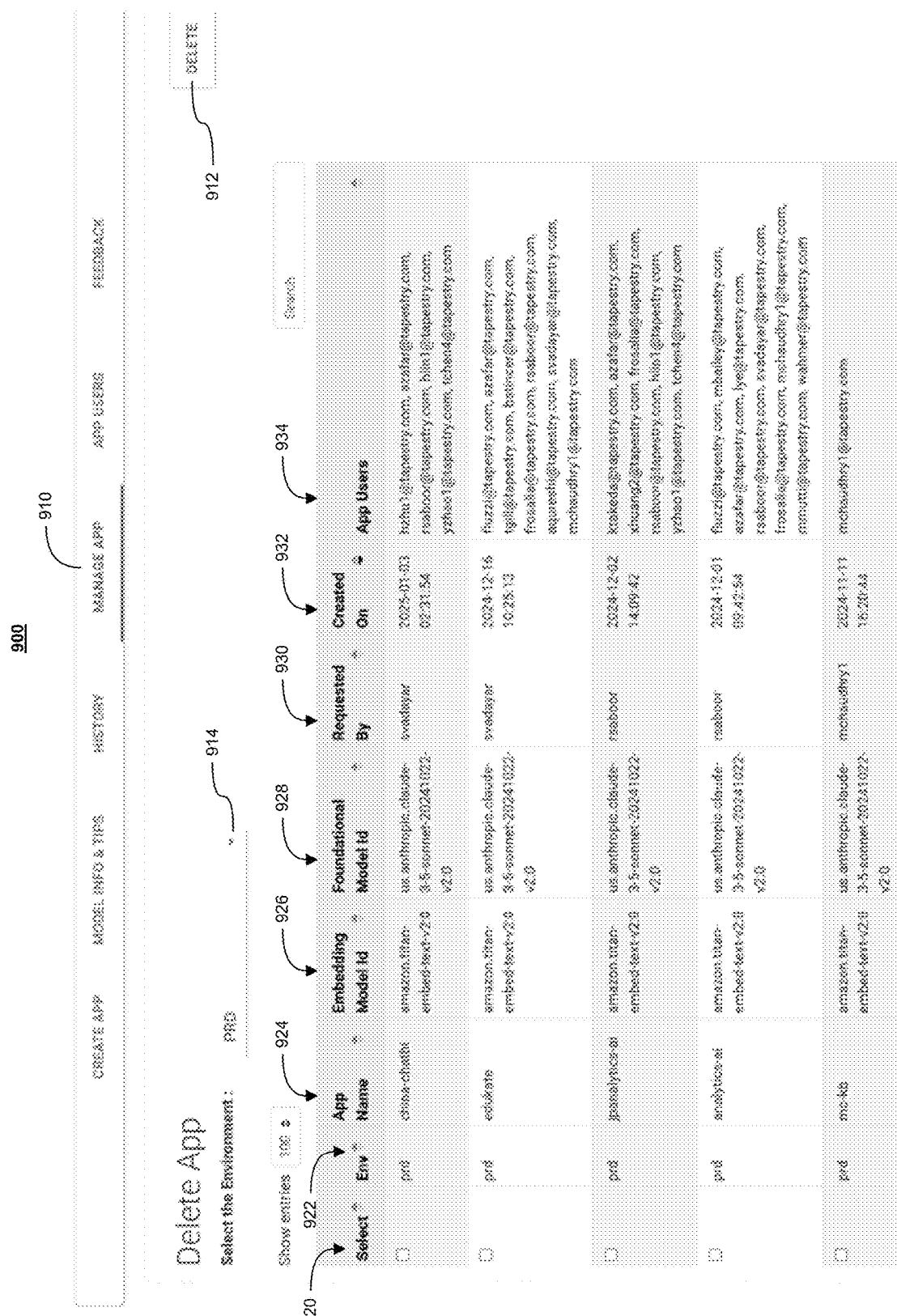
FIG. 9 illustrates a display screen of the user interface showing a manage app interface.

FIG. 9 illustrates a display screen 900 of the user interface showing a manage app interface. Display screen 900 can include a manage app tab 910. Display screen 900 also can include a delete button 912, which can provide users with options to manage and remove AI applications within the agentic AI creation studio. Display screen 900 also can include an environment selector 914, which can allow users to choose an environment setting for viewing and managing applications.

The interface can contain multiple columns for organizing application information. For example, display screen 900 can include a selection column 920, which can allow users to select specific applications for actions such as deletion; an environment column 922, which can display the current deployment environment of each application; an application name column 924, which can list the names of the AI applications; an embedding model column 926, which can show the corresponding embedding model information for each application; a foundational model column 928, which can display the foundational model used by each application; a requestor column 930, which can show who requested the creation of each application; a creation date column 932, which can display when each application was created; and a users column 934, which can list the users associated with or having access to each application.

In some embodiments, the manage app interface can allow the user to add "prompt and generate" functionality, which can allow users to input a text prompt or instruction to an AI system, which then processes and interprets the input and generates a response or content based on the prompt. In some embodiments, the manage app interface can allow the user to add logs to the AI agents, add, modify, or delete users (e.g., admin users, general users, etc.) for the AI agents. In some embodiments, the manage app interface can allow the user to change the foundational model at runtime, which can work due to the modular design.

Figure 10:
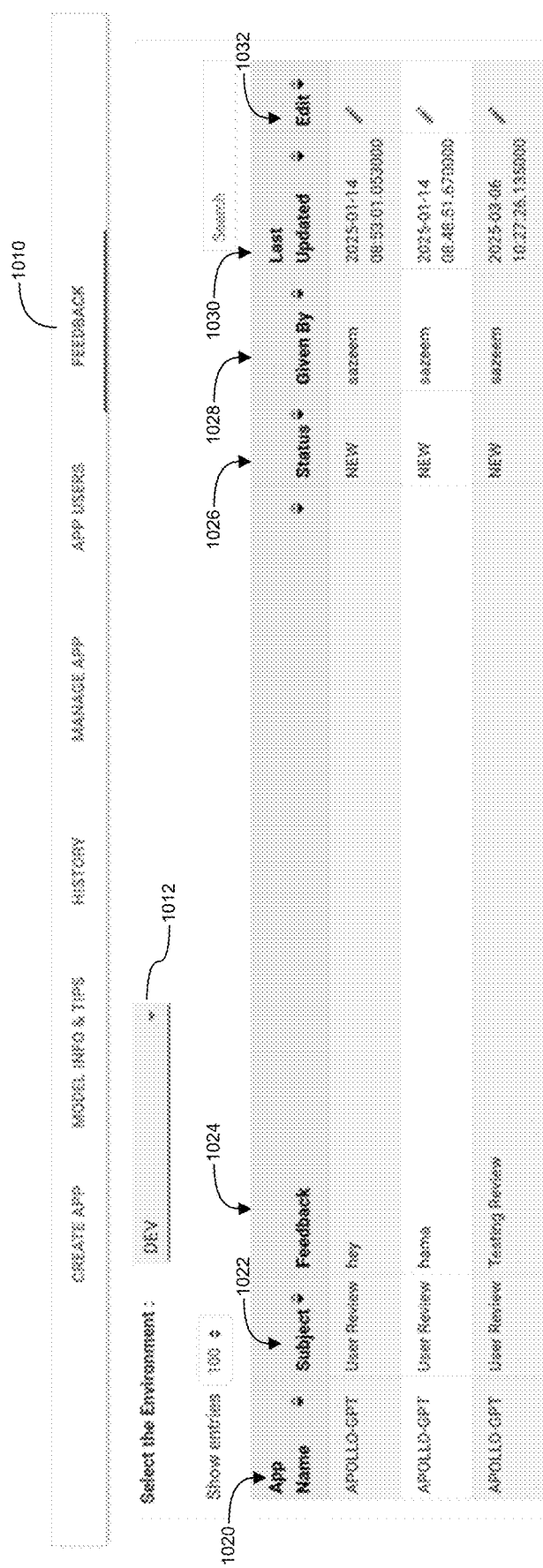
FIG. 10 illustrates a display screen of the user interface showing a feedback interface.

FIG. 10 illustrates a display screen 1000 of the user interface showing a feedback interface. Display screen 1000 can include a feedback tab 1010. Display screen 1000 also can include an environment selector 1012, which can allow selection of different environments for viewing feedback data.

The interface can contain multiple columns for organizing feedback information. For example, display screen 1000 can include an application column 1020, which can display the application names associated with each feedback entry; a subject column 1022, which can show the subject matter or topic of the feedback; a feedback column 1024, which can contain the actual feedback content provided by users; a status column 1026, which can indicate the current status of feedback items (e.g., new, in progress, resolved); a contributor column 1028, which can show who provided the feedback; an update column 1030, which can display when the feedback was last updated or modified; and an edit column 1032, which can be provided on to allow modification or updating of feedback entries, which can enable ongoing management and resolution of user-provided feedback within the agentic AI creation studio.

Although the methods described above are with reference to the illustrated flowchart, it will be appreciated that many other ways of performing the activities associated with the method can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

Although the agentic AI creation, contextualized enterprise data interaction, and enterprise AI memory storage has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-10 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders. As another example, the systems within system 300 (FIG. 3) can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A computer-implemented method comprising:
receiving, via an artificial intelligence (AI) agent, a user prompt from a user;
translating, via the AI agent, the user prompt to an LLM prompt using a business function semantic layer to interpret business function-specific language in the user prompt, wherein translating the user prompt to the LLM prompt further comprises translating the user prompt to the LLM prompt using an enterprise memory to provide user-specific and enterprise-wide AI interaction context, and wherein the enterprise memory comprises a short-term memory component and a long-term memory component;
obtaining a data query generated by an LLM based on the LLM prompt;
executing the data query on an enterprise data system to obtain datasets responsive to the data query;
generating a response to the user prompt using a qualitative analysis of the datasets; and
providing the response to the user.

2. The computer-implemented method of claim 1 further comprising, before receiving the user prompt:
receiving, via an agentic AI creation studio, inputs for creating the AI agent; and
generating the AI agent based on the inputs.

3. The computer-implemented method of claim 2, wherein the inputs comprise selections for an agent type, a foundational model for the LLM, and an embedding model.

4. The computer-implemented method of claim 3, wherein the agent type is selected from options comprising general, numeric, and web crawler.

5. The computer-implemented method of claim 2, wherein the agentic AI creation studio comprises user-level access controls.

6. The computer-implemented method of claim 2, wherein the inputs specify one or more business functions.

7. The computer-implemented method of claim 2, wherein the inputs specify one or more enterprise knowledge bases.

8. The computer-implemented method of claim 1, wherein the business function semantic layer comprises a system-level configuration file that provides interoperability with the LLM.

9. The computer-implemented method of claim 1, wherein the business function semantic layer is interoperable with multiple different LLMs comprising the LLM.

10. The computer-implemented method of claim 1, wherein the business function semantic layer is configured to be refreshed at runtime.

11. The computer-implemented method of claim 1, wherein the data query is SQL code.

12. The computer-implemented method of claim 1, wherein the enterprise memory stores and synthesizes interactions across multiple AI agents comprising the AI agent and multiple users comprising the user.

13. The computer-implemented method of claim 1, wherein the short-term memory component is configured to store in-progress conversations and session-aware context for the user.

14. The computer-implemented method of claim 1, wherein the long-term memory component is configured to store persistent logs of user-agent interactions across sessions.

15. The computer-implemented method of claim 1 further comprising:
receiving, via the AI agent, user feedback for the response; and
storing a weighted average of user feedback data comprising the user feedback in the enterprise memory.

16. The computer-implemented method of claim 1 further comprising:
synthesizing one or more patterns from data stored in the enterprise memory; and
providing one or more suggestions to the user based on the patterns.

17. A computer-implemented method comprising:
receiving, via an agentic AI creation studio, inputs for creating an artificial intelligence (AI) agent;
generating the AI agent based on the inputs;
receiving, via the AI agent, a user prompt from a user;
translating, via the AI agent, the user prompt to an LLM prompt using a business function semantic layer to interpret business function-specific language in the user prompt;
obtaining a data query generated by an LLM based on the LLM prompt;
executing the data query on an enterprise data system to obtain datasets responsive to the data query;
generating a response to the user prompt using a qualitative analysis of the datasets; and
providing the response to the user,
wherein:
the inputs comprise selections for an agent type, a foundational model for the LLM, and an embedding model; and
the agent type is selected from options comprising general, numeric, and web crawler.

18. A system comprising one or more processors and one or more non-transitory computer-readable media storing computing instructions that, when executed on the one or more processors, cause the one or more processors to perform operations comprising:
receiving, via an artificial intelligence (AI) agent, a user prompt from a user;
translating, via the AI agent, the user prompt to an LLM prompt using a business function semantic layer to interpret business function-specific language in the user prompt, wherein translating the user prompt to the LLM prompt further comprises translating the user prompt to the LLM prompt using an enterprise memory to provide user-specific and enterprise-wide AI interaction context, and wherein the enterprise memory comprises a short-term memory component and a long-term memory component;
obtaining a data query generated by an LLM based on the LLM prompt;
executing the data query on an enterprise data system to obtain datasets responsive to the data query;
generating a response to the user prompt using a qualitative analysis of the datasets; and
providing the response to the user.

19. The system of claim 18, wherein:
the operations further comprise, before receiving the user prompt:
receiving, via an agentic AI creation studio, inputs for creating the AI agent; and
generating the AI agent based on the inputs,
wherein:
the inputs comprise selections for an agent type, a foundational model for the LLM, and an embedding model; and
the agent type is selected from options comprising general, numeric, and web crawler.

20. One or more non-transitory computer-readable media storing computing instructions that, when executed on one or more processors, cause the one or more processors to perform operations comprising:
receiving, via an artificial intelligence (AI) agent, a user prompt from a user;
translating, via the AI agent, the user prompt to an LLM prompt using a business function semantic layer to interpret business function-specific language in the user prompt, wherein translating the user prompt to the LLM prompt further comprises translating the user prompt to the LLM prompt using an enterprise memory to provide user-specific and enterprise-wide AI interaction context, and wherein the enterprise memory comprises a short-term memory component and a long-term memory component;
obtaining a data query generated by an LLM based on the LLM prompt;
executing the data query on an enterprise data system to obtain datasets responsive to the data query;
generating a response to the user prompt using a qualitative analysis of the datasets; and
providing the response to the user.

* * * * *